United States Patent
Warner

(10) Patent No.: US 12,544,644 B2
(45) Date of Patent: Feb. 10, 2026

(54) BASKETBALL BACKBOARD AND RIM COVERS AND ASSOCIATED METHODS

(71) Applicant: Hoopsnug LLC, Avon Lake, OH (US)

(72) Inventor: Ronald Warner, Avon Lake, OH (US)

(73) Assignee: Hoopsnug LLC, Avon Lake, OH (US)

( * ) Notice: Subject to any disclaimer, the term of this patent is extended or adjusted under 35 U.S.C. 154(b) by 0 days.

(21) Appl. No.: 18/813,661

(22) Filed: Aug. 23, 2024

(65) Prior Publication Data

US 2024/0416211 A1 Dec. 19, 2024

Related U.S. Application Data

(63) Continuation of application No. 18/076,810, filed on Dec. 7, 2022, now Pat. No. 12,070,671.

(60) Provisional application No. 63/400,392, filed on Aug. 23, 2022.

(51) Int. Cl.
| | | |
|---|---|---|
| *A63B 71/00* | (2006.01) | |
| *A63B 63/08* | (2006.01) | |
| *G09F 7/00* | (2006.01) | |
| *G09F 7/18* | (2006.01) | |
| *G09F 23/00* | (2006.01) | |

(52) U.S. Cl.
CPC .......... *A63B 71/0036* (2013.01); *G09F 7/002* (2013.01); *G09F 7/18* (2013.01); *G09F 23/0066* (2013.01); *A63B 63/083* (2013.01); *G09F 2007/1856* (2013.01)

(58) Field of Classification Search
CPC ..... A63B 71/0036; A63B 63/083; G09F 7/18; G09F 7/002
USPC ........................................................ 473/485
See application file for complete search history.

(56) References Cited

U.S. PATENT DOCUMENTS

| | | |
|---|---|---|
| D398,346 S | 9/1998 | Wiedner |
| D398,347 S | 9/1998 | Wiedner |
| 5,813,930 A | 9/1998 | Strauther |
| D402,346 S | 12/1998 | Wiedner et al. |
| D404,096 S | 1/1999 | Wiedner et al. |
| D404,447 S | 1/1999 | Wiedner et al. |
| D423,615 S | 4/2000 | Wiedner et al. |
| D423,616 S | 4/2000 | Wiedner et al. |
| D434,091 S | 11/2000 | Wiedner |
| D434,092 S | 11/2000 | Wiedner |

(Continued)

FOREIGN PATENT DOCUMENTS

EP 1336425 A1 * 8/2003 ........... A63B 63/083

OTHER PUBLICATIONS

Parent U.S. Appl. No. 18/076,810, HoopFX Basketball Cover.

*Primary Examiner* — Nathan J Jenness
*Assistant Examiner* — Justin Caudill
(74) *Attorney, Agent, or Firm* — MacMillan, Sobanski & Todd, LLC

(57) ABSTRACT

Basketball backboard and rim covers are described. An example basketball backboard and rim cover includes a main body that has a first portion and a second portion. The first portion has a front, a back, and defines a recess and an opening. The recess extends from the back toward the front. The opening is defined on the front and provides access to the recess. The second portion contacts the first portion and extends away from the front of the first portion. The second portion has a first end, a second end, and defines a chamber that extends from the opening defined by the first portion toward the second end of the second portion.

20 Claims, 27 Drawing Sheets

(56) References Cited

U.S. PATENT DOCUMENTS

| | | |
|---|---|---|
| 6,196,938 B1 | 3/2001 | Wiedner |
| D460,134 S | 7/2002 | Jones |
| 7,086,189 B2 | 8/2006 | Morris et al. |
| D590,899 S * | 4/2009 | King .......................... D21/705 |
| 2004/0035035 A1 | 2/2004 | Morris |

* cited by examiner

BASKETBALL BACKBOARD AND RIM COVERS AND ASSOCIATED METHODS

RELATED APPLICATIONS

This application is a continuation of U.S. Nonprovisional application Ser. No. 18/076,810, filed Dec. 7, 2022, which claims the benefit of U.S. Provisional Application No. 63/400,392, which was filed on Aug. 23, 2022. The entire disclosure of each of these related applications is hereby incorporated by reference into this disclosure.

FIELD

The disclosure relates generally to the field of sports equipment. More particularly, the disclosure relates to basketball backboard and rim covers, methods of covering a basketball backboard, and methods of displaying indicia on a basketball backboard.

BACKGROUND

The game of basketball is well known throughout the world. People of all ages enjoy the challenge of shooting a basketball toward a basketball goal. Generally, basketball goals include a support pole, an extension arm, a backboard attached to the support pole by the extension arm, a rim attached to the backboard, and a net suspended from the rim. The rim and the net are generally referred to as a basket.

As a result of its popularity, basketball goals are commonly found outdoors in parks, on playgrounds, attached to garages, in driveways, on streets, and other places where the game may be played. Due to their complexity and bulk, owners of outdoor basketball goals tend to leave the equipment in place and unprotected throughout the year, even during winter months where, in some localities, the weather can be severe and can adversely impact the backboard and basket. For example, exposure to the elements may result in the backboard, basket, or components thereof rusting, rotting, becoming discolored, or otherwise deteriorating. Such wear can be unsightly, shorten the useful life of the basketball goal, and/or be dangerous to those playing the game. In addition, deterioration of a backboard can impact game play as the ball may not properly play off the improperly cared-for backboard.

In addition to the above, in some situations it is desirable to provide advertising or other indicia to promote goods, services, or personal interests using a backboard as a display. However, placing such advertising or indicia directly on a backboard presents a distraction during game play to both the players and spectators. Furthermore, if placed directly on a backboard, the advertising or indicia may be difficult to change.

A need exists, therefore, for new and useful basketball backboard and rim covers, methods of covering a basketball backboard, and methods of displaying indicia on a basketball backboard.

SUMMARY OF SELECTED EXAMPLE EMBODIMENTS

Various example basketball backboard and rim covers and associated methods are described herein.

An example basketball backboard and rim cover includes a main body that has a first portion and a second portion. The first portion has a front, a back, and defines a recess and an opening. The recess extends from the back toward the front. The opening is defined on the front and provides access to the recess. The second portion contacts the first portion and extends away from the front of the first portion. The second portion has a first end, a second end, and defines a chamber that extends from the opening defined by the first portion toward the second end of the second portion.

Another example basketball backboard and rim cover includes a main body that has a first portion and a second portion. The first portion has a front, a back, a top, a bottom, a first side, a second side, a first cap, a front midpoint, and defines a recess, an opening, and a first cavity. The first cap extends from the front to the back, from the top toward the bottom, and from the first side to the second side. The front midpoint is disposed on the front and between the top and the bottom. The recess extends from the back toward the front. The opening is defined on the front and provides access to the recess. The first cavity extends from the recess and into the first cap. The second portion contacts the first portion, is disposed between the front midpoint and the bottom of the first portion, and extends away from the front of the first portion. The second portion has a first end, a second end, and defines a chamber that extends from the opening defined by the first portion toward the second end of the second portion.

Another example basketball backboard and rim cover includes a main body, a first securing member, and a second securing member. The main body has a first portion and a second portion. The first portion has a front, a back, a top, a bottom, a first side, a second side, a first cap, a front midpoint, a first corner support, a second corner support, and defines a recess, an opening, a first cavity, a second cavity, and a third cavity. The first cap extends from the front to the back, from the top toward the bottom, and from the first side to the second side. The front midpoint is disposed on the front and between the top and the bottom. The first corner support extends from the front to the back, from the first side toward the second side, and from the bottom toward the top. The second corner support extends from the front to the back, from the second side toward the first side, and from the bottom toward the top. The recess extends from the back toward the front. The opening is defined on the front and provides access to the recess. The first cavity extends from the recess and into the first cap. The second cavity extends from the recess and into the first corner support. The third cavity extends from the recess and into the second corner support. The second portion contacts the first portion, is disposed between the front midpoint and the bottom of the first portion, and extends away from the front of the first portion. The second portion has a first end, a second end, and defines a chamber that extends from the opening defined by the first portion toward the second end of the second portion. The first securing member extends from the first cap to the first corner support. The second securing member extends from the first cap to the second corner support.

Additional understanding of these example basketball backboard and rim covers and associated methods can be obtained by review of the detailed description, below, and the appended drawings.

DETAILED DESCRIPTION OF SELECTED EXAMPLES

Figure 1:
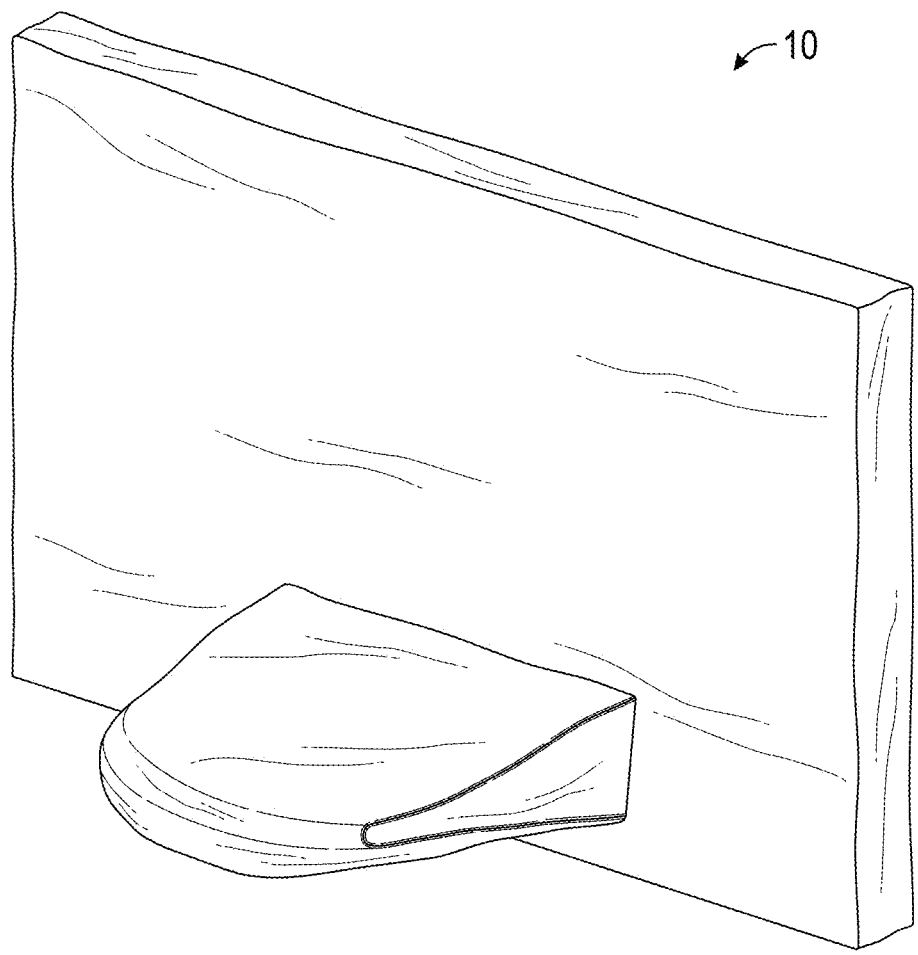
FIG. 1 is a perspective view of an example basketball backboard and rim cover.
Figure 2:
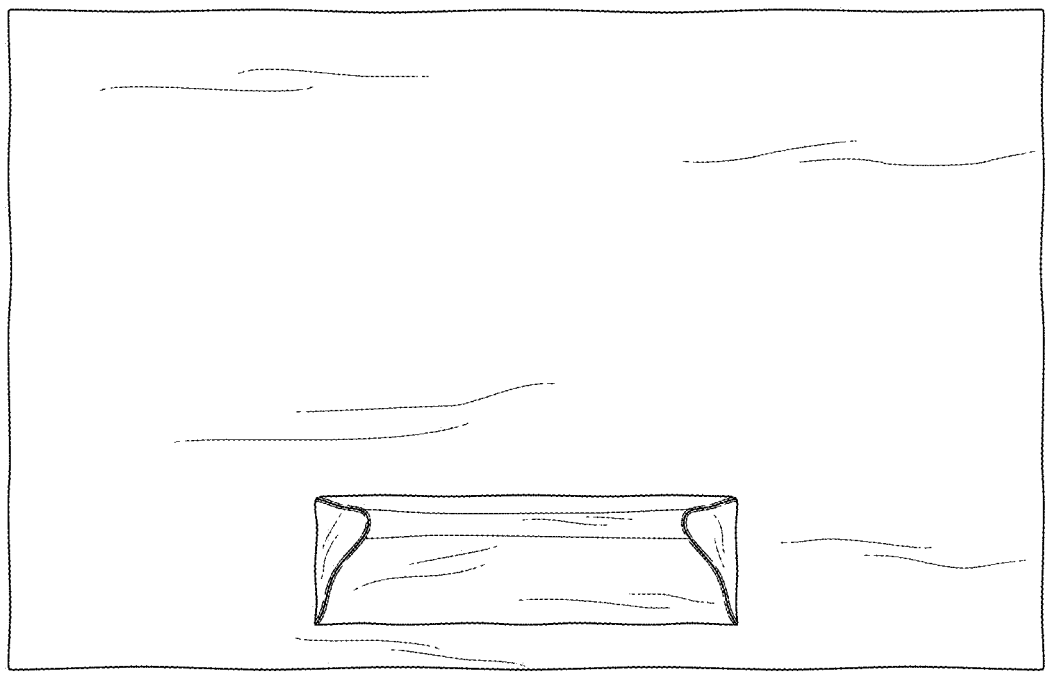
FIG. 2 is a front view of the cover shown in FIG. 1.

The following detailed description and the appended drawings describe and illustrate various example embodiments of basketball backboard and rim covers, methods of covering a basketball backboard, and methods of displaying indicia on a basketball backboard. The description and illustration of these examples are provided to enable one skilled in the art to make and use a basketball backboard and rim cover, to practice a method of covering a basketball backboard, and to practice a method of displaying indicia on a basketball backboard. They are not intended to limit the scope of the claims in any manner. The invention is capable of being practiced or carried out in various ways and the examples described and illustrated herein are merely selected examples of the various ways of practicing or carrying out the invention and are not considered exhaustive.

FIGS. 1 through 12 illustrate an example basketball backboard and rim cover 10. FIGS. 7 through 12 illustrate the cover 10 disposed over a basketball backboard 12 and rim 14. The cover 10 has a main body 16 and a plurality of securing members 18. The main body 16 has a first portion 20 and a second portion 22.

The first portion 20 has a lengthwise axis 23, a top 24, a bottom 26, a front 28, a back 30, a first side 32, a second side 34, a first terminal end 36, a second terminal end 38, a height 25, a front midpoint 27, a thickness 29, a length 31, a display surface 33, and defines a recess 40, an opening 42, a first cap 44, a first cavity 46, a second cap 48, and a second cavity 50.

The height 25 extends from the top 24 to the bottom 26. The front midpoint 27 is centrally disposed on the front 28, between the top 24 and the bottom 26, and between the first side 32 and the second side 34. The thickness 29 extends from the front 28 to the back 30. The length 31 extends from the first side 32 to the second side 34. The display surface 33 is disposed on the front 28 of the first portion 20, between the top 24 of the first portion 20 and the second portion 22, between the first side 32 and the second side 34, and provides a surface on which indicia can be positioned. In the illustrated embodiment, and when placed on a backboard, the display surface 33 is substantially flat.

While the display surface 33 has been illustrated as being disposed at a particular location on the front 28 of the first portion 20, a display surface can be positioned at any suitable location on a cover, or any suitable portion of a cover (e.g., first portion, second portion, top, bottom, side, front, back), and include any suitable indicia. Examples of indicia considered suitable to include on a display surface include insignias, logos, trademarks, service marks, designs, advertising material, and any other indicia considered suitable for a particular embodiment.

In the embodiment shown, the recess 40 extends from the back 30 toward the front 28, from the first side 32 to the second side 34, and from the first terminal end 36 to the second terminal end 38. The recess 40, along with the first and second cavities 46, 50, are sized and configured to house the basketball backboard 12, or a portion thereof. As a result, the recess 40, the first cavity 46, and the second cavity 50 cooperatively house the basketball backboard 12. The opening 42 is defined on the front 28 between the front midpoint 27 and the bottom 26 and provides access to the recess 40. The opening 42 is sized and configured to allow the rim 14, and a net when attached to a rim, to pass through the opening 42 and into the chamber 66 defined by the second portion 22, as described in more detail below.

The first cap 44 extends from the front 28 to the back 30, from the top 24 toward the bottom 26, and from the first side 32 to the second side 34. The first cavity 46 extends from the recess 40 and into the first cap 44 and is sized and configured to receive a portion (e.g., top portion) of the backboard 12. In the illustrated embodiment, the first cap 44 extends along the entire length 31 of the first portion 20 and includes the first terminal end 36. However, in alternative embodiments a first cap can extend along only a portion of a length of a first portion.

The second cap 48 extends from the front 28 to the back 30, from the bottom 26 toward the top 24, and from the first side 32 to the second side 34. The second cavity 50 extends from the recess 40 and into the second cap 48 and is sized and configured to receive a portion (e.g., bottom portion) of the backboard 12. In the illustrated embodiment, the second cap 48 extends along the entire length 31 of the first portion 20 and includes the second terminal end 38. However, in alternative embodiments a second cap can extend along only a portion of a length of a first portion.

While the first and second terminal ends 36, 38 have been illustrated at particular locations on the first portion 20, a first terminal end and a second terminal end of a first portion of a cover can be positioned at any suitable location on a cover. Selection of a suitable location to position first and second terminal ends can be based on various considerations, such as the dimensions of a backboard to which a cover is to be attached. For example, a first terminal end can be located at, or near, the bottom or top of a first portion and/or a second terminal end can be located at, or near, the top or the bottom of a first portion. In some alternative embodiments, a first and second cap can overlap along the back of the first portion.

The second portion 22 contacts the first portion 20 and extends away from the front 28 of the first portion 20. In the illustrated embodiment, the second portion 22 is disposed between the front midpoint 27 of the first portion 20 and the bottom 26 of the first portion 20 and extends from the front 28 of the first portion 20 and away from the back 30 of the first portion 20. In the embodiment shown, the second portion 22 is permanently attached to the first portion 20, completely surrounds the opening 42 defined by the first portion 20, is formed of the same material as the first portion 20, and the first portion 20 and the second portion 22 are formed from an uninterrupted piece of material.

The second portion 22 has a lengthwise axis 53, a top 54, a bottom 56, a first end 58, a second end 60, a first side 62, second side 64, a first height 55, a second height 57, a length 59, a width 61, and defines a chamber 66. The first height 55 of the second portion 22 is disposed at the first end 58, extends from the top 54 of the second portion 22 to the bottom 56 of the second portion 22, and is less than the height 25 of the first portion 20. The second height 57 is disposed at the second end 60 of the second portion 22, extends from the top 54 of the second portion 22 to the bottom 56 of the second portion 22, and is less than the first height 55. However, in alternative embodiments a second height of a second portion can be greater than or equal to a first height of the second portion.

In the illustrated embodiment, the bottom 56 of the second portion 22 extends from the second end 60 of the second portion 22, toward the first portion 20, and away from the top 54 of the second portion 22. However, in alternative embodiments a bottom of a second portion can extend parallel to, or toward a top of a second portion. The first end 58 of the second portion 22 is disposed at the junction between the first portion 20 and the second portion 22. The second portion 22 is permanently attached to the first portion 20 such that the entire first end 58 of the second portion 22 is in contact with the first portion 20. However, alternative embodiments can include a second portion in which only a portion of a first end of the second portion contacts a first portion and/or a second portion that only partially surrounds an opening defined by a first portion. The length 59 of the second portion 22 extends from the first end 58 of the second portion 22 to the second end 60 of the second portion 22 and is greater than the thickness 29 of the first portion 20. The width 61 of the second portion 22 extends from the first side 62 to the second side 64 and is less than the length 31 of the first portion 20.

The chamber 66 extends from the opening 42 defined by the first portion 20, away from the back 30 of the first portion 20 (e.g., recess 40 of the first portion 20), and toward the second end 60 of the second portion 22. The chamber 66 is sized and configured to allow the rim 14 and, when included, an attached net to be passed into the chamber 66 and to house the rim 14 and, when included, net.

When the cover 10 is disposed on a backboard 12 and rim 14, the second portion 22 is disposed at an angle 63 relative to the front 28 of the first portion 20. In the embodiment shown, the top 54 of the second portion 22 is disposed at an angle 63 relative to the front 28 of the first portion 20. A second portion can be disposed at any suitable angle relative to a first portion and selection of a suitable angle can be based on various considerations, including the structural arrangement of the backboard and/or rim on which a cover is intended to be disposed. Examples of angles considered suitable between a second portion and a first portion include angles greater than, less than, or substantially equal to 45 degrees, 90 degrees, angles between about 45 degrees and about 135 degrees, and any other angle considered suitable for a particular embodiment. In the embodiment shown, the angle 63 is greater than 45 degrees and substantially equal to 90 degrees.

Figure 3:
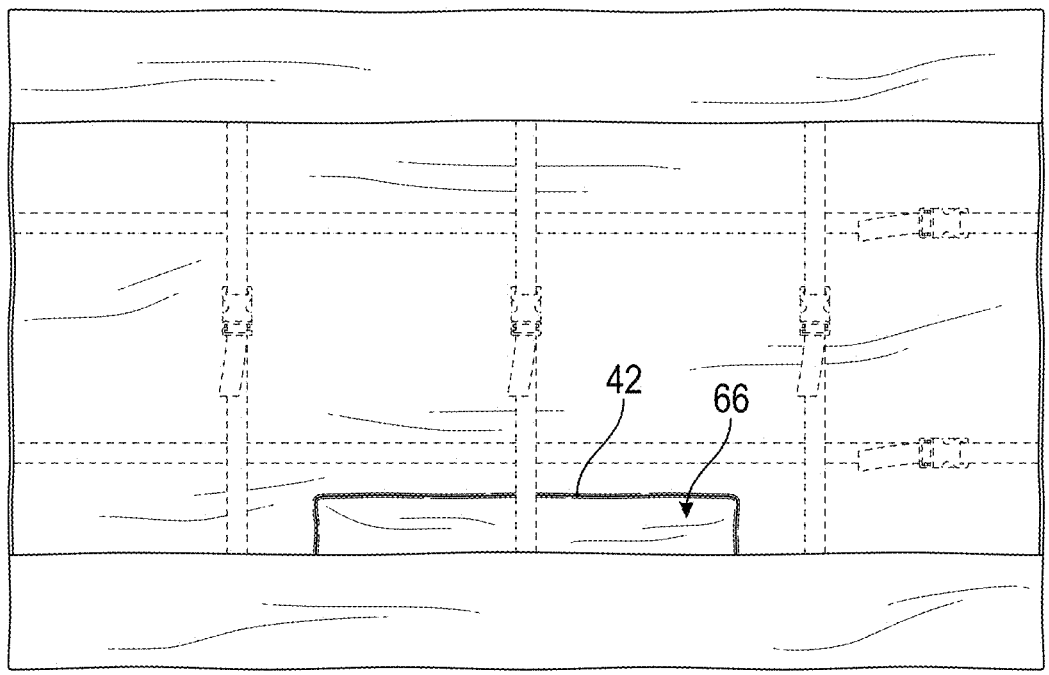
FIG. 3 is a rear view of the cover shown in FIG. 1.
Figure 4:
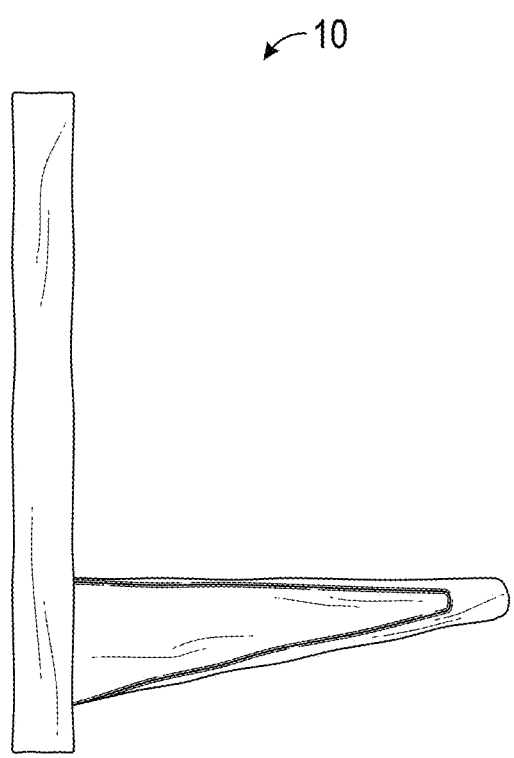
FIG. 4 is a left side view of the cover shown in FIG. 1. The right side view of the cover is a mirror image of the left side view.
Figure 5:
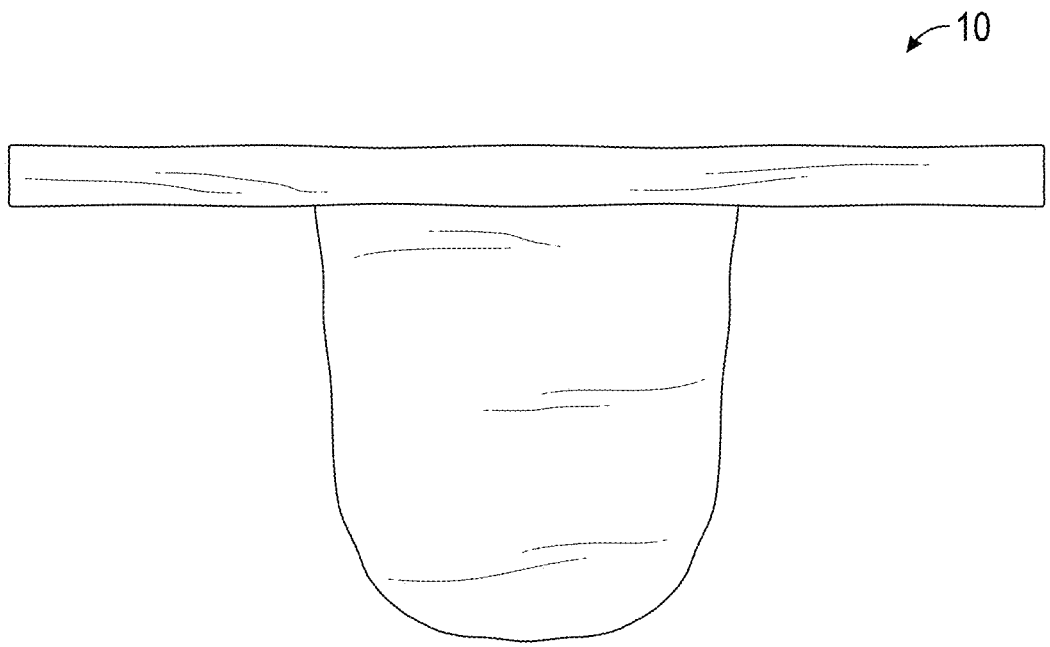
FIG. 5 is a top view of the cover shown in FIG. 1.
Figure 6:
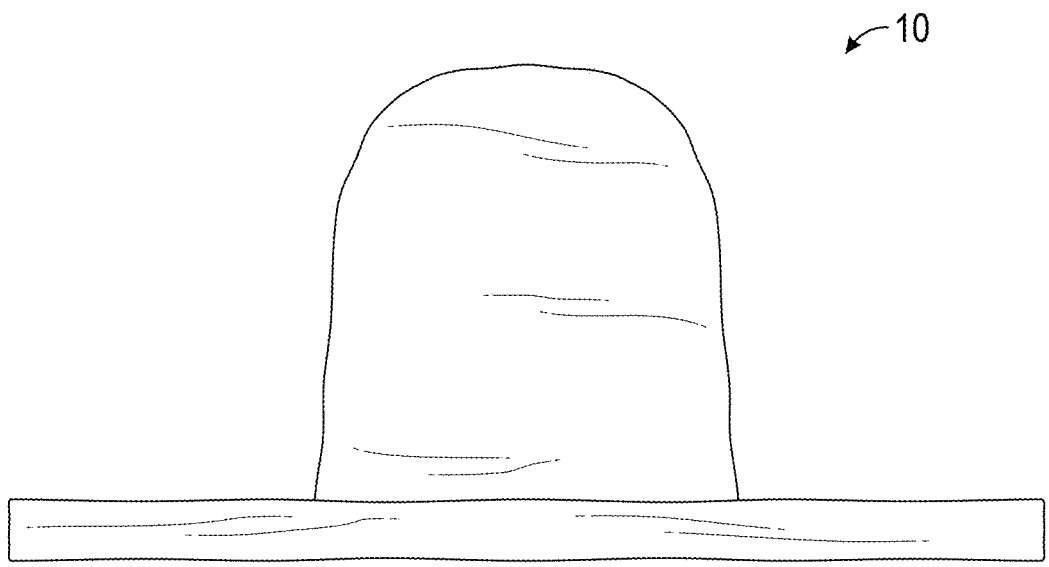
FIG. 6 is a bottom view of the cover shown in FIG. 1.
Figure 7:
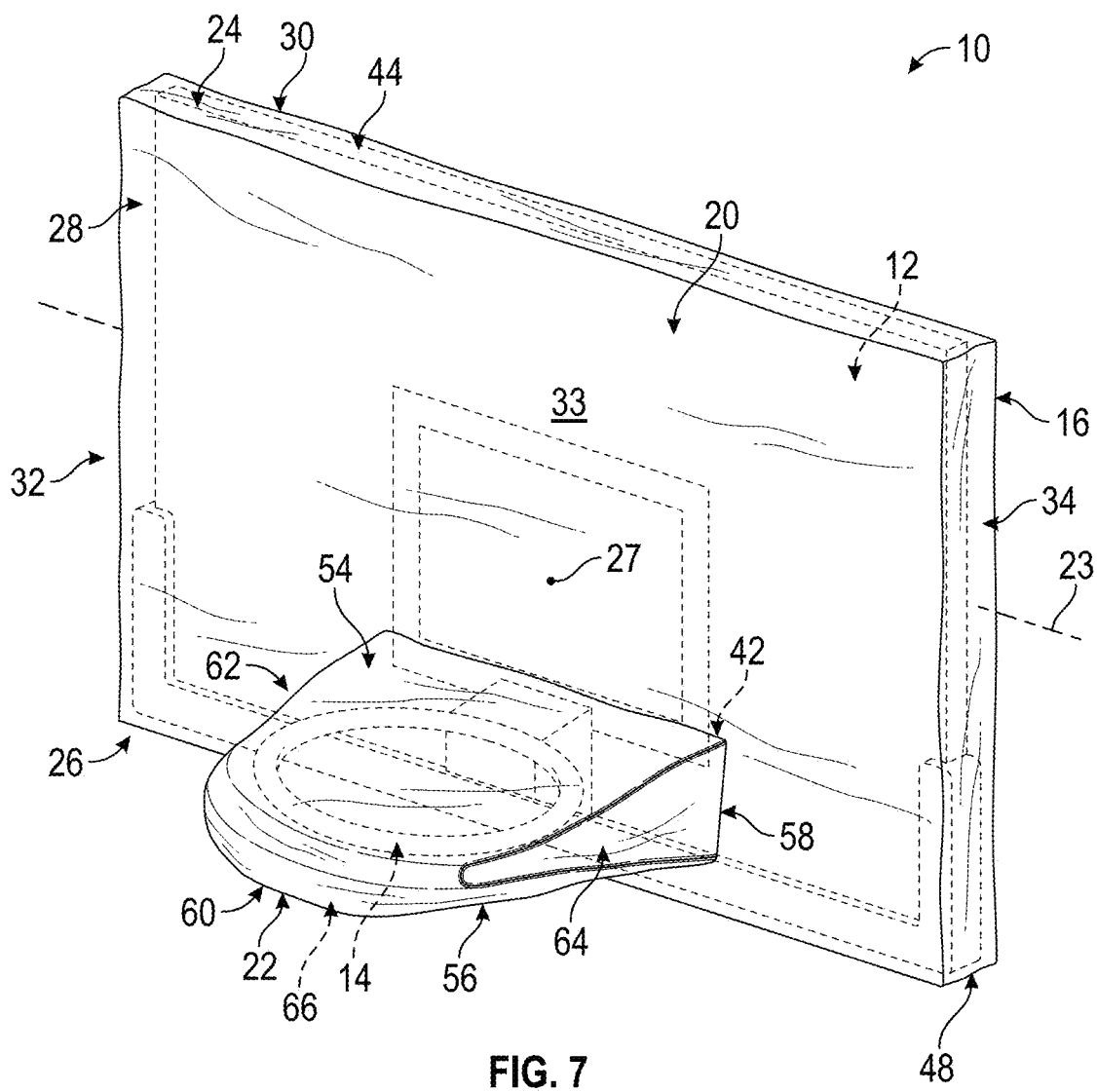
FIG. 7 is a perspective view of the cover shown in FIG. 1 disposed over a basketball backboard and rim.
Figure 8:
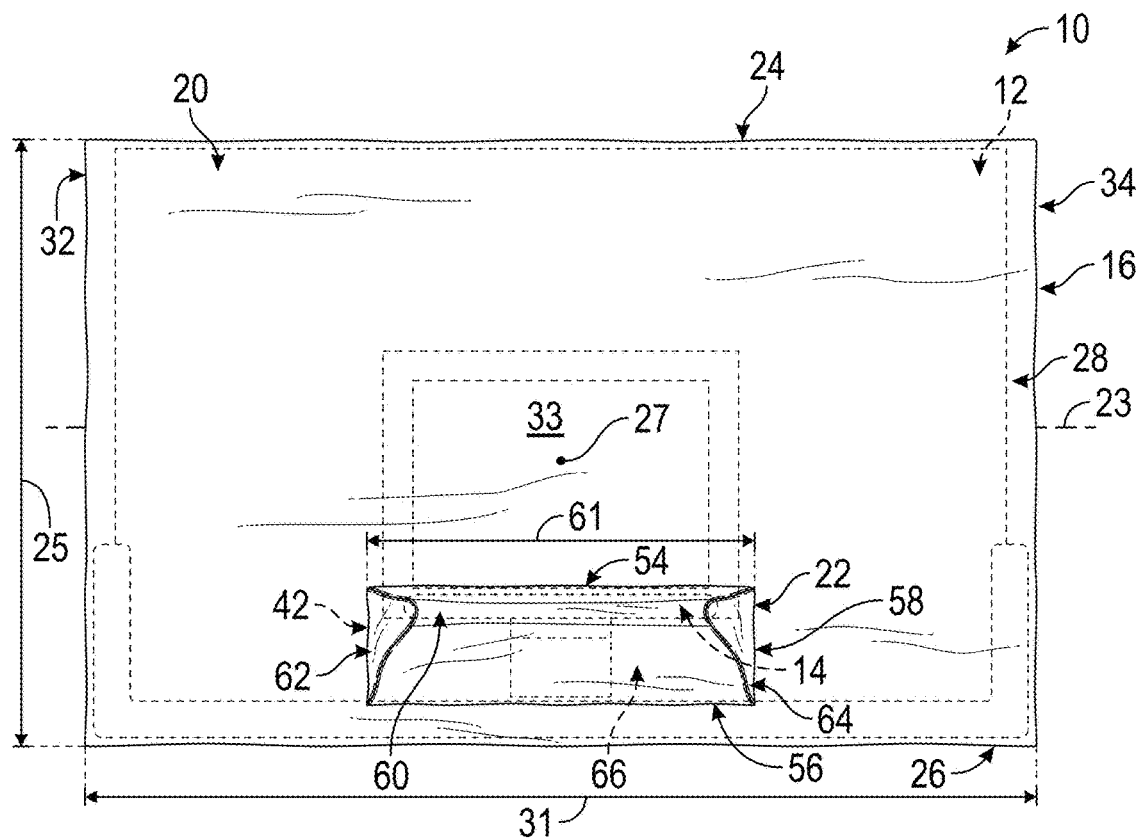
FIG. 8 is a front view of the cover, basketball backboard, and rim shown in FIG. 7.
Figure 9:
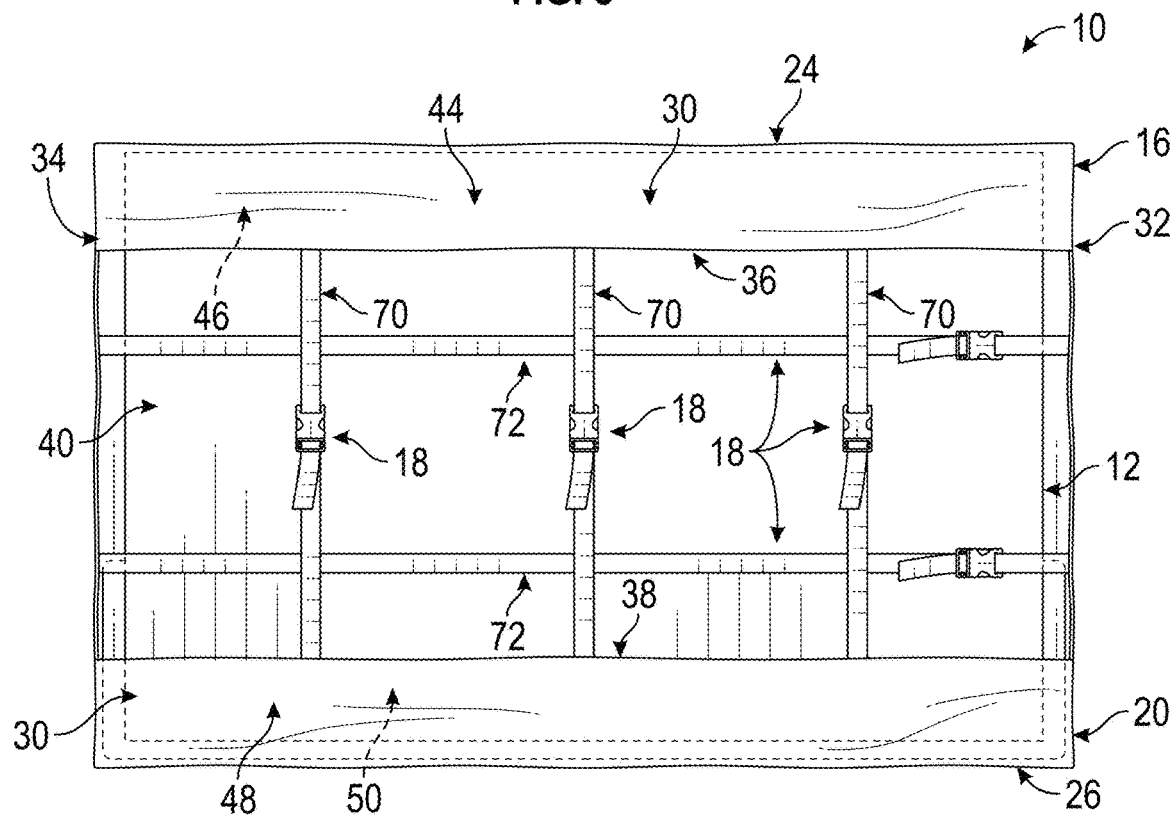
FIG. 9 is a rear view of the cover, basketball backboard, and rim shown in FIG. 7.
Figure 10:
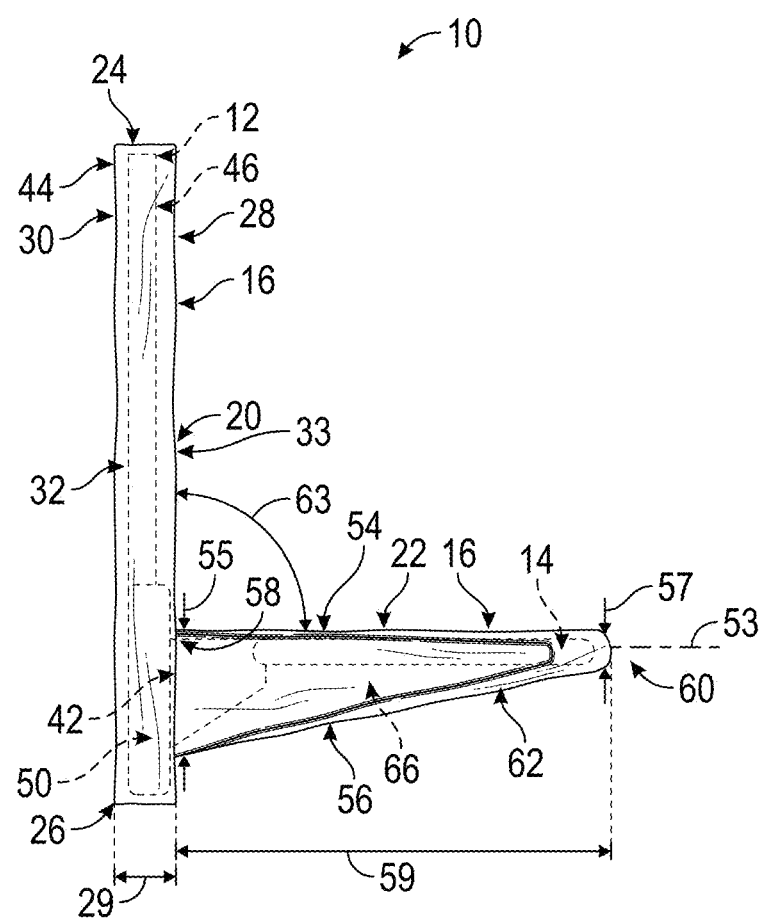
FIG. 10 is a left side view of the cover, basketball backboard, and rim shown in FIG. 7. The right side view of the cover, basketball backboard, and rim is a mirror image of the left side view.
Figure 11:
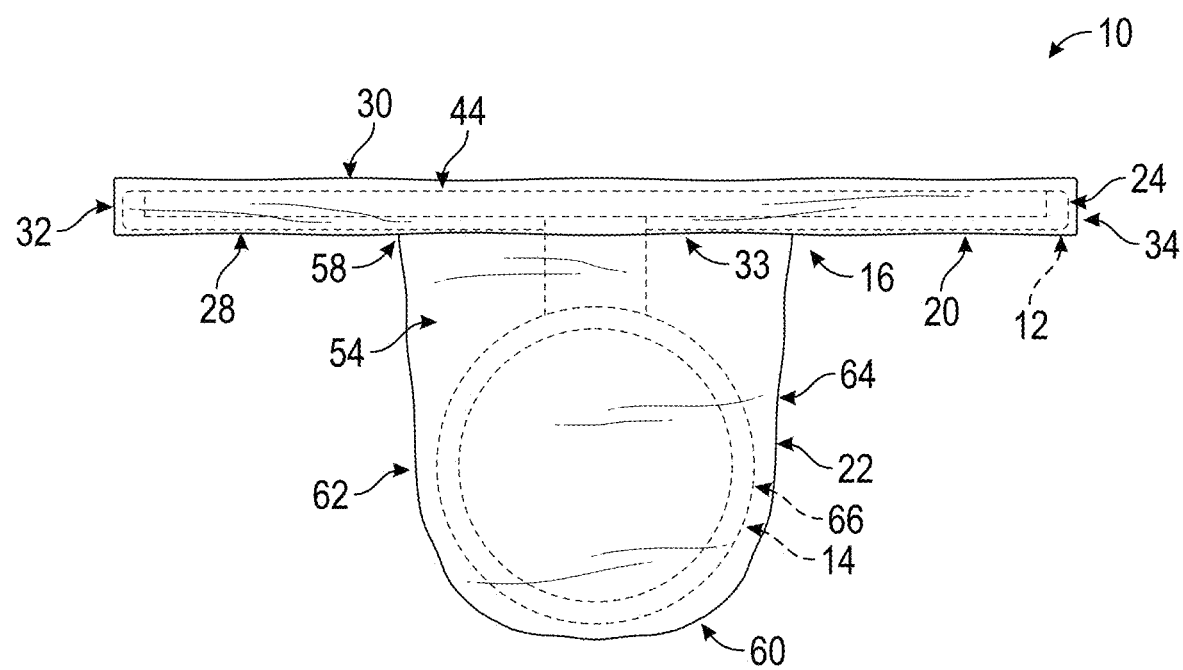
FIG. 11 is a top view of the cover, basketball backboard, and rim shown in FIG. 7.
Figure 12:
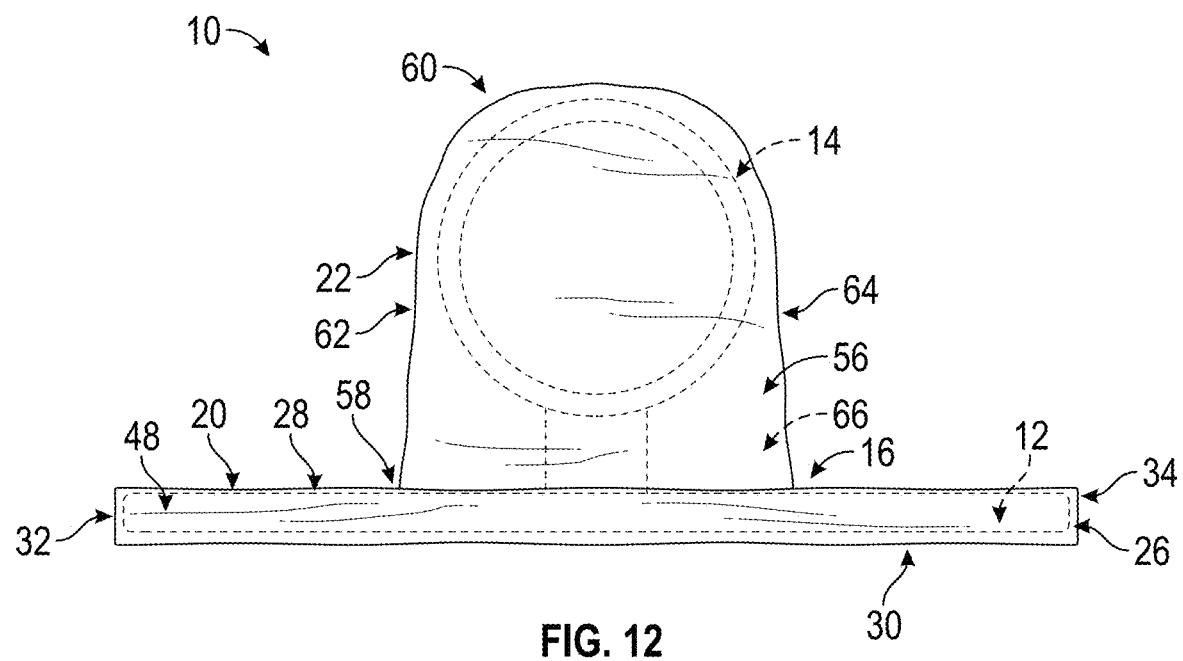
FIG. 12 is a bottom view of the cover, basketball backboard, and rim shown in FIG. 7.
Figure 13:
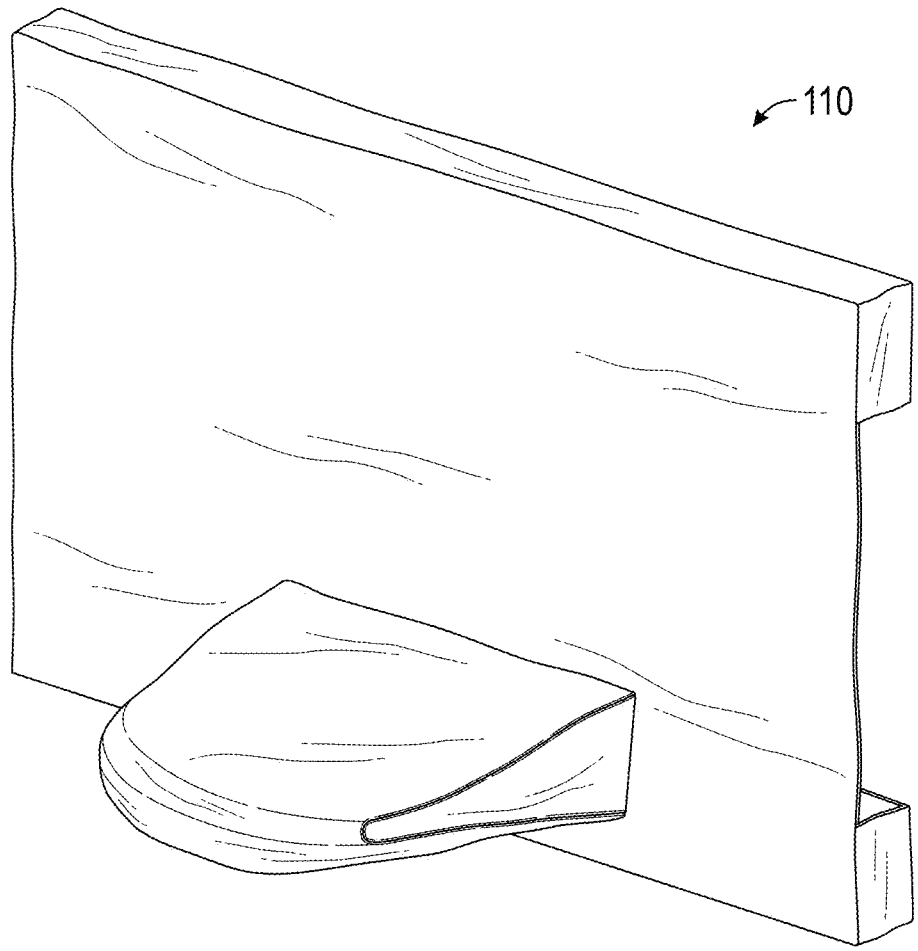
FIG. 13 is a perspective view of another example basketball backboard and rim cover.
Figure 14:
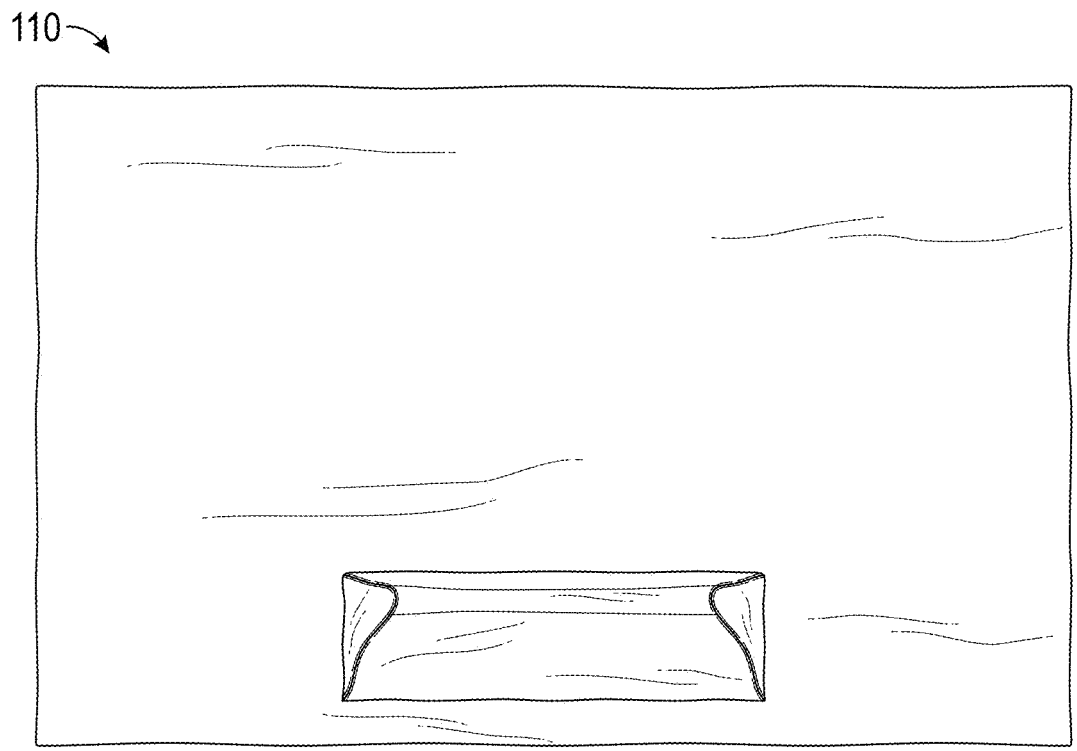
FIG. 14 is a front view of the cover shown in FIG. 13.
Figure 15:
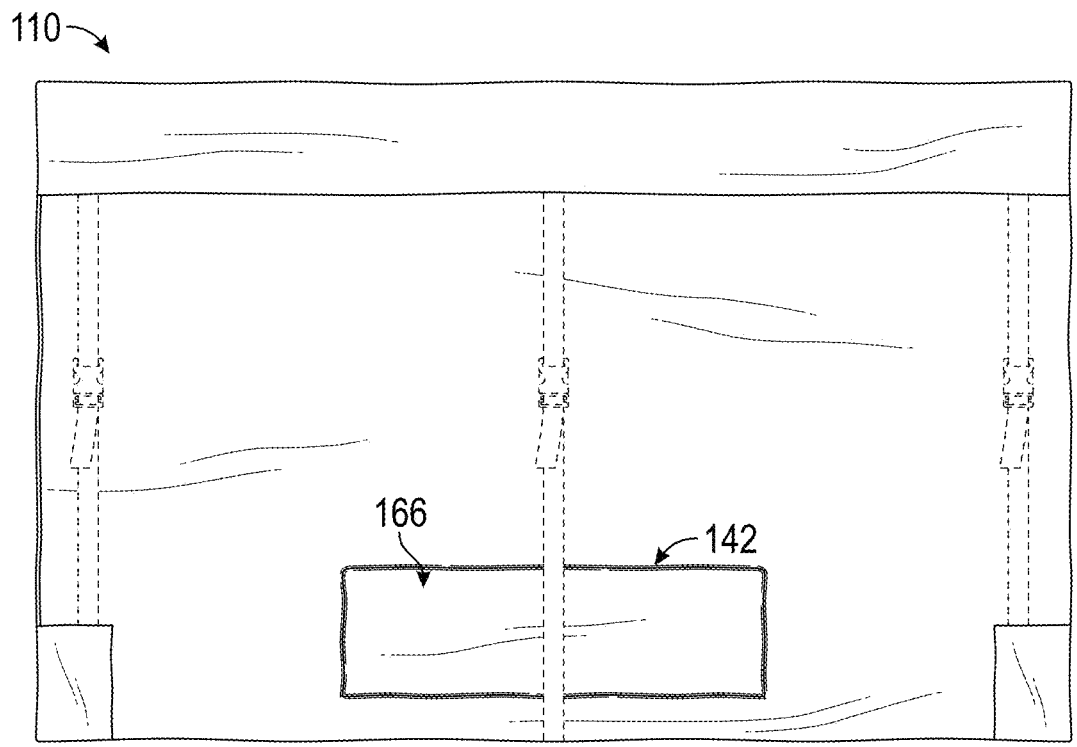
FIG. 15 is a rear view of the cover shown in FIG. 13.
Figure 16:
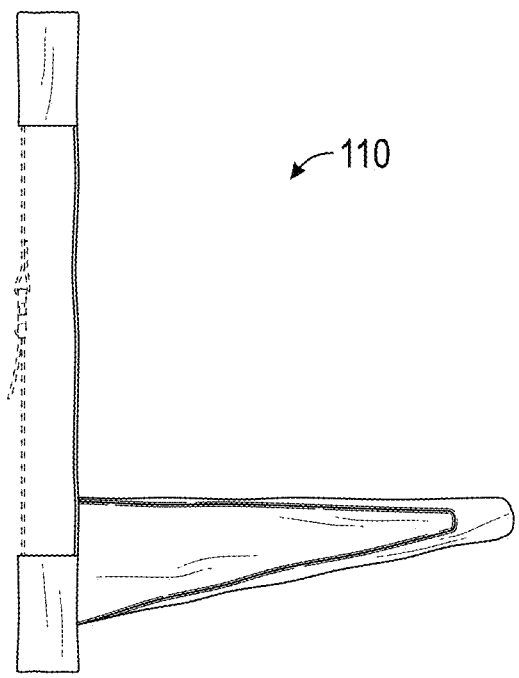
FIG. 16 is a left side view of the cover shown in FIG. 13. The right side view of the cover is a mirror image of the left side view.
Figure 17:
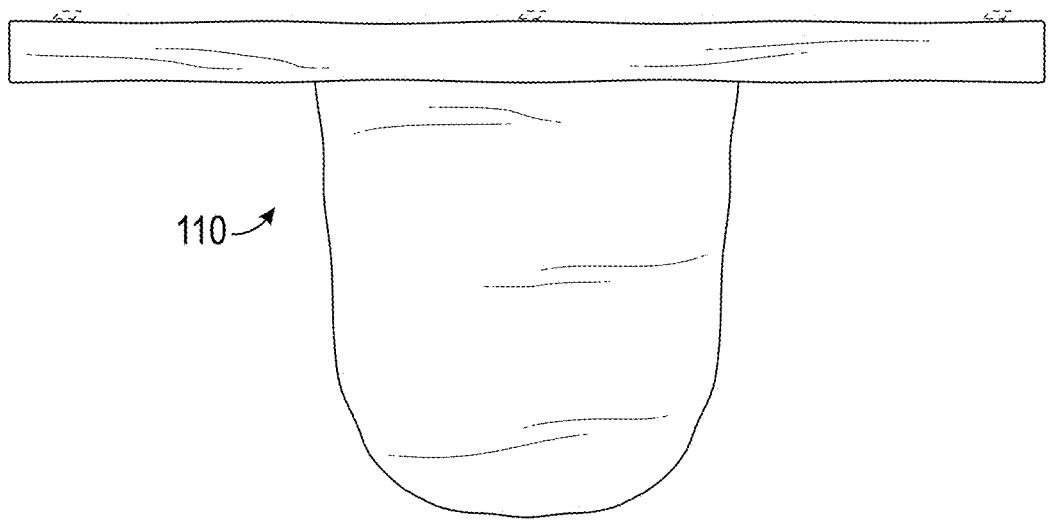
FIG. 17 is a top view of the cover shown in FIG. 13.
Figure 18:
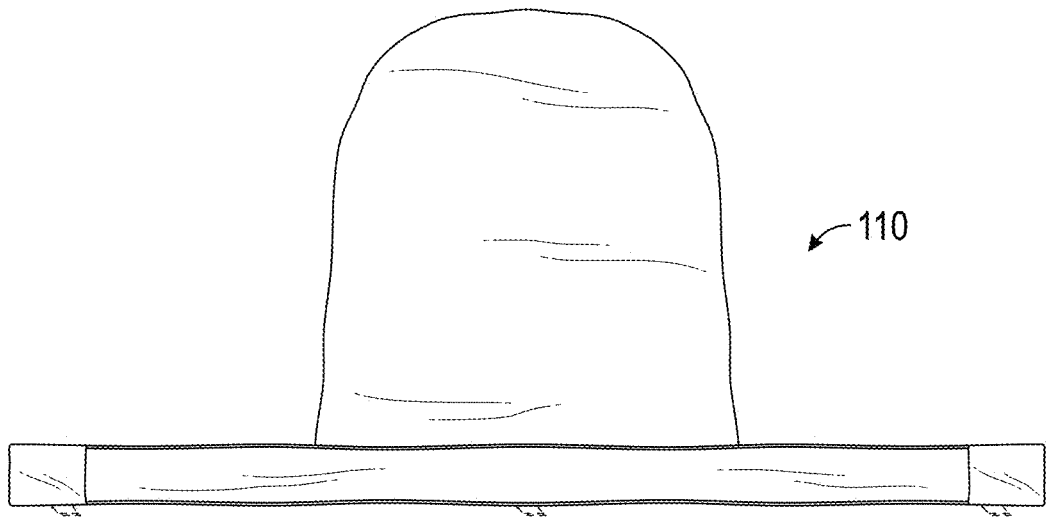
FIG. 18 is a bottom view of the cover shown in FIG. 13.
Figure 19:
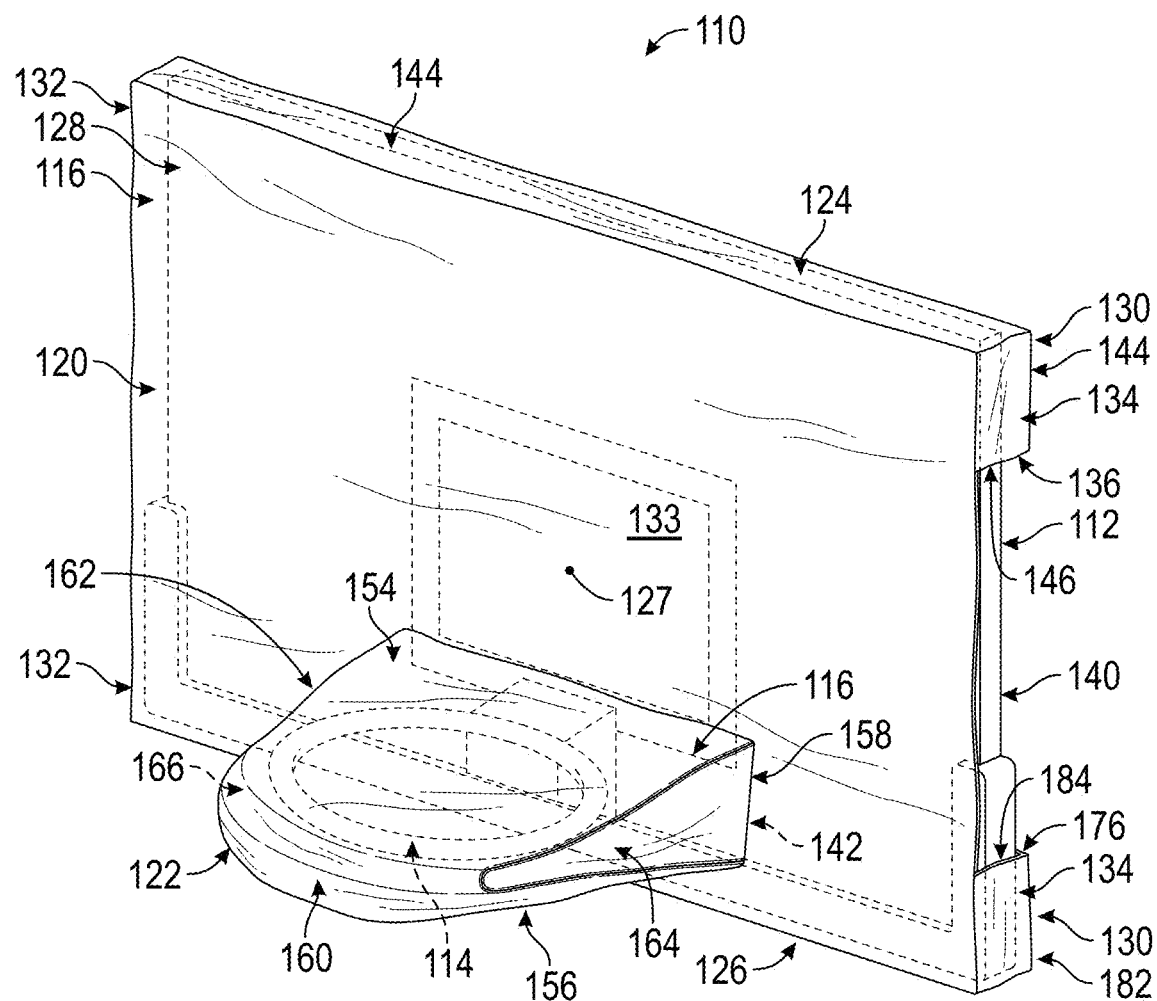
FIG. 19 is a perspective view of the cover shown in FIG. 13 disposed over a basketball backboard and rim.
Figure 20:
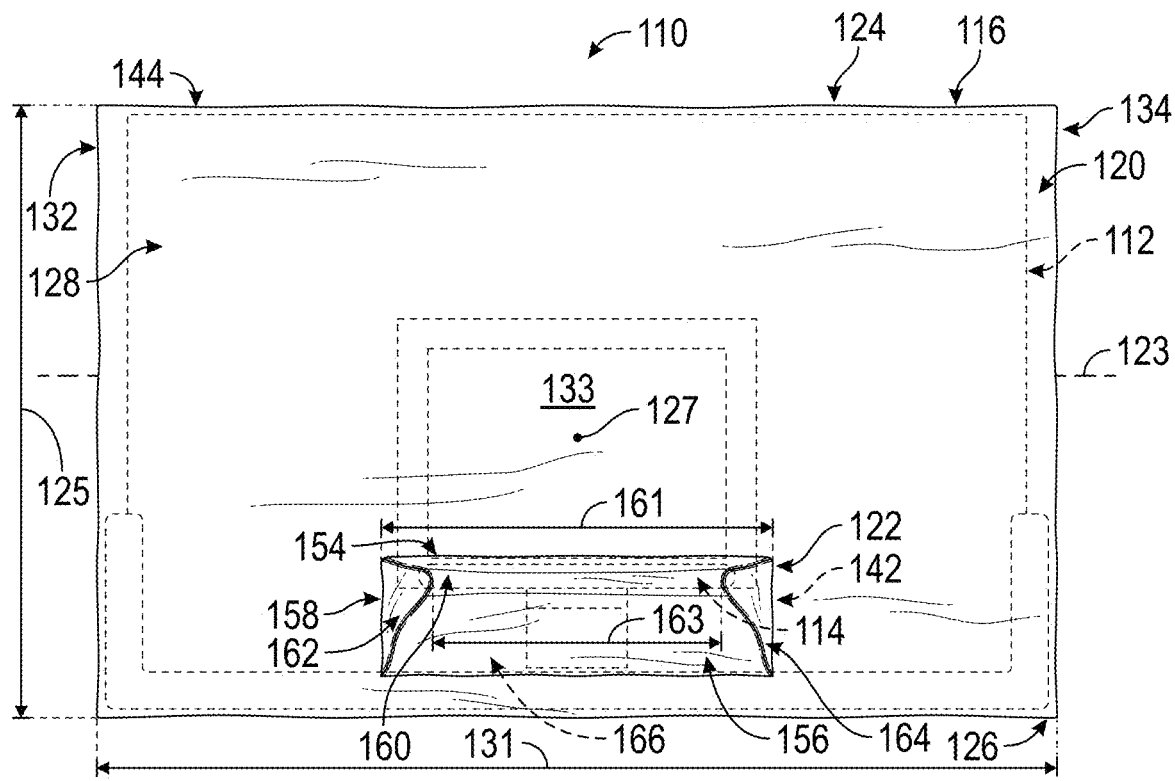
FIG. 20 is a front view of the cover, basketball backboard, and rim shown in FIG. 19.
Figure 21:
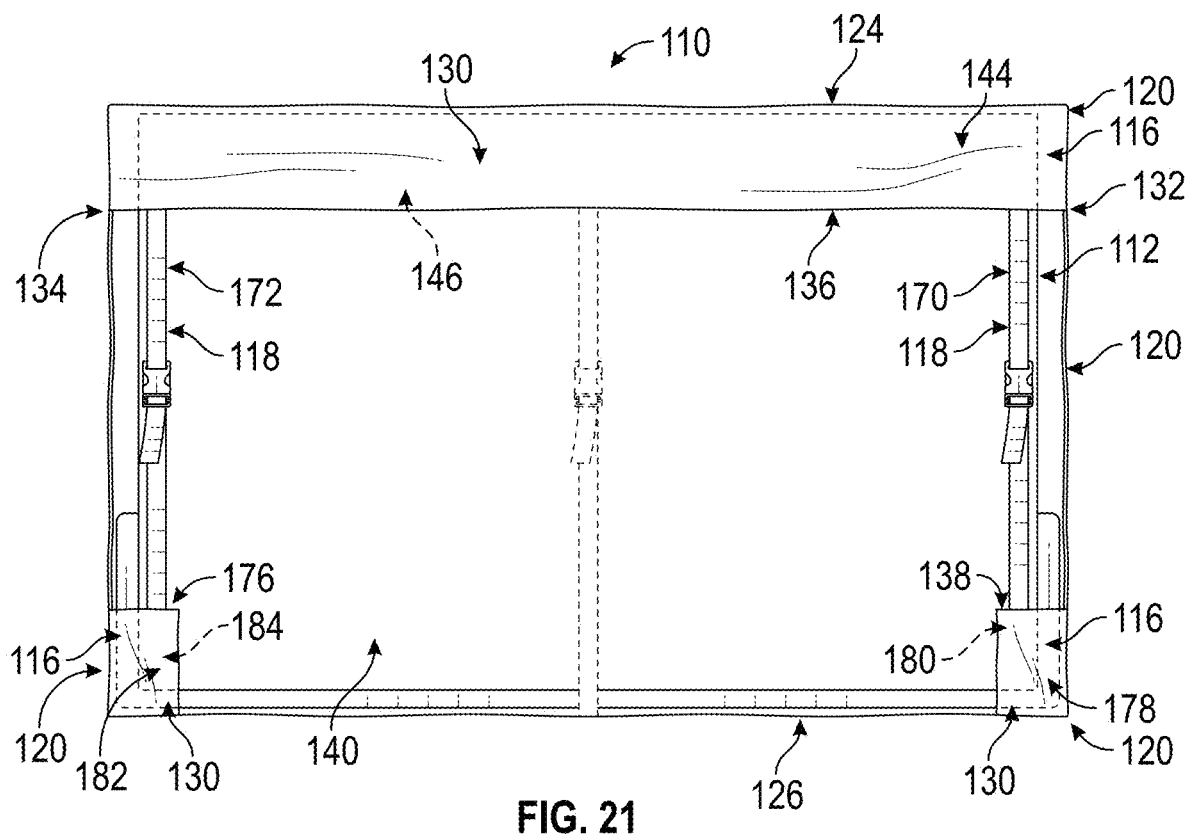
FIG. 21 is a rear view of the cover, basketball backboard, and rim shown in FIG. 19.
Figure 22:
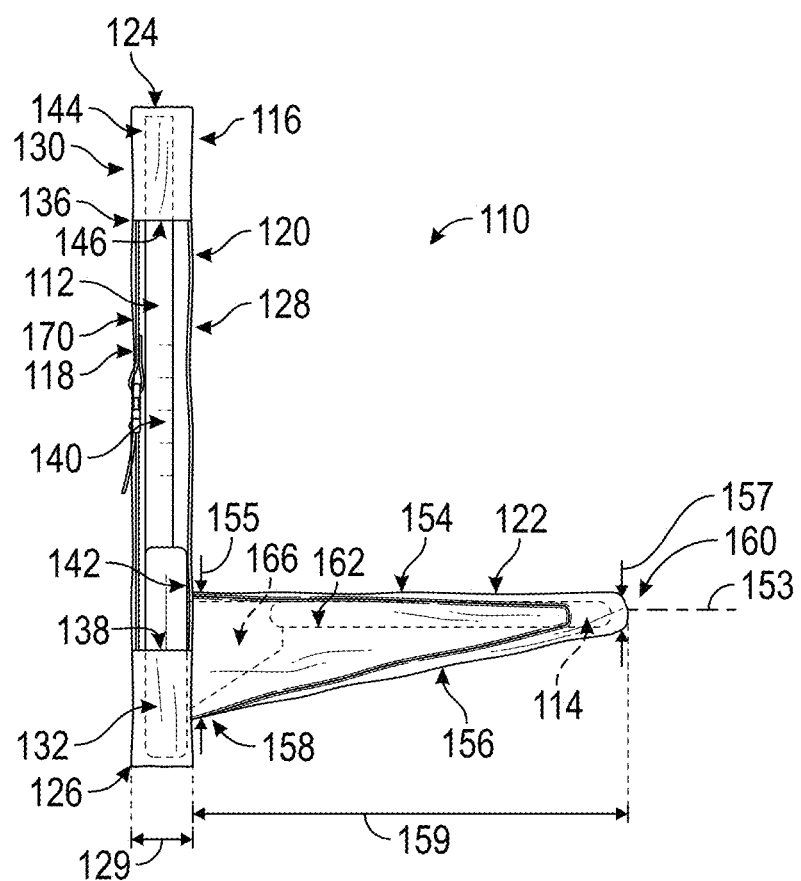
FIG. 22 is a left side view of the cover, basketball backboard, and rim shown in FIG. 19. The right side view of the cover, basketball backboard, and rim is a mirror image of the left side view.
Figure 23:
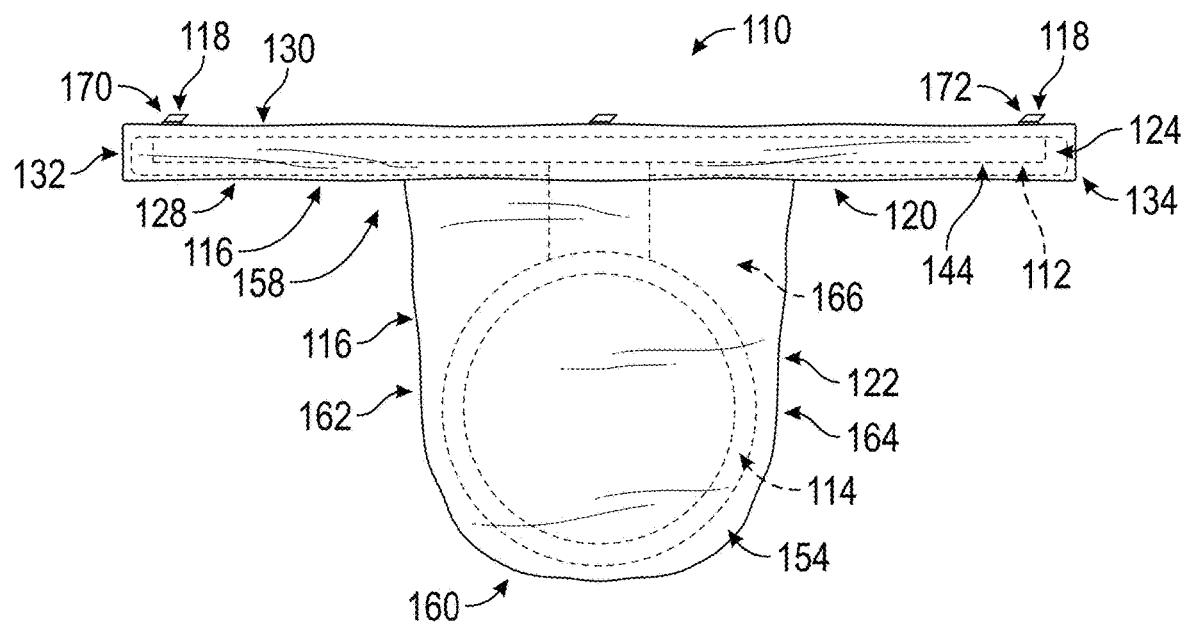
FIG. 23 is a top view of the cover, basketball backboard, and rim shown in FIG. 19.
Figure 24:
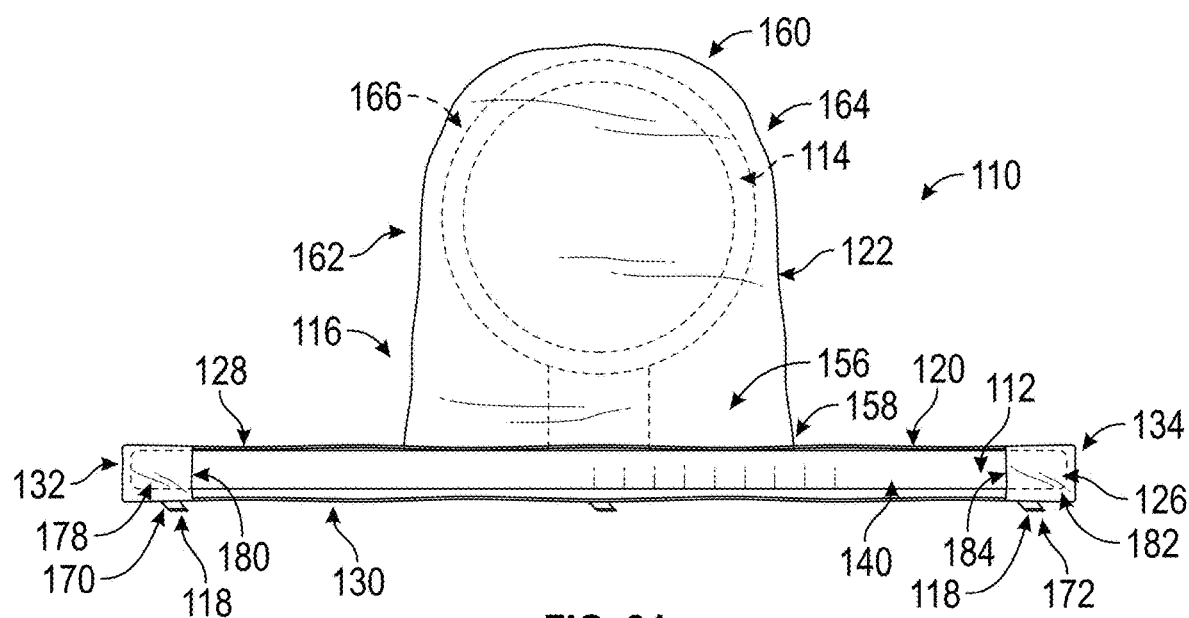
FIG. 24 is a bottom view of the cover, basketball backboard, and rim shown in FIG. 19.

The plurality of securing members 18 includes a first set of securing members 70 and a second set of securing members 72. FIG. 3 shows the plurality of securing members 18 in hidden lines for clarity and to indicate that the plurality of securing members 18 can be omitted from, or replaced with other structure, to accomplish releasable attachment of the cover 10 to a basketball backboard 12 and rim 14. Each securing member in the first set of securing members 70 extends from the first cap 44 to the second cap 48 and each securing member in the second set of securing members 72 extends from the first side 32 of the first portion 20 to the second side 34 of the first portion 20. Each securing member of the plurality of securing members 18 provides a mechanism for securing the cover 10 to the backboard 12 such that it covers the backboard 12 and rim 14. A securing member can include any suitable component capable of providing releasable attachment between a cover and a backboard and selection of a suitable securing member to include on a cover can be based on various considerations, including the material forming a cover and/or the size and shape of a backboard to which a cover intended to be attached. Examples of securing members considered suitable to include in a cover include straps or adjustable length straps with or without a buckle (e.g., side release buckle), elastic straps, straps that include hook and loop fasteners, drawstrings that extend from a first cap to a second cap and/or from a first side to a second side, buttons, snaps, clips, magnets, hook and eye fasteners, combinations of those described herein, and any other securing member considered suitable for a particular embodiment. Alternative embodiments, however, can omit the inclusion of a plurality of securing members and use alternative structure to releasably attach a cover to a backboard, as described in more detail herein. In the illustrated embodiment, each securing member of the plurality of securing members 18 is a strap with a side release buckle.

While a plurality of securing members has been illustrated as being included in the cover 10, a cover can include any suitable number of securing members and selection of a suitable number of securing members can be based on various considerations, including the size and shape of a backboard to which a cover is intended to be attached. Examples of numbers of securing members considered suitable to include in a cover include zero, one, at least one, two, a plurality, three, four, five, six, more than six, and any other number considered suitable for a particular embodiment.

A main body of a cover can be formed of any suitable material, manufactured using any suitable technique or method, and a cover can have any suitable structural arrangement. Selection of a suitable material to form a main body, technique or method to manufacture a cover, and/or of a suitable structural arrangement for a cover can be based on various considerations, including the type of climate within which a cover is intended to be used. Examples of materials considered suitable to form a cover include water resistant materials, synthetic materials, natural materials, nylon, vinyl, Lycra, plastic, cotton, combinations of the materials described herein, and any other material considered suitable for a particular embodiment. Examples of other structural arrangements are described herein. However, alternative structural arrangements that accomplish covering a backboard and rim are considered suitable. Example techniques and methods of manufacturing a cover include stitching various components to one another, using sonic welding to attach one or more components to one another, forming a cover from a single, unitary piece of material, using adhesives, combinations of those described herein, and any other technique or method considered suitable for a particular embodiment.

FIGS. 13 through 24 illustrate another example basketball backboard and rim cover 110. FIGS. 19 through 24 illustrate the cover 110 disposed over a basketball backboard 112 and rim 114. The cover 110 is similar to the cover 10 illustrated in FIGS. 1 through 12 described above, except as detailed below. The cover 110 has a main body 116 and a plurality of securing members 118. The main body 116 has a first portion 120 and a second portion 122.

In the embodiment shown, the first portion 120 has a lengthwise axis 123, a top 124, a bottom 126, a front 128, a back 130, a first side 132, a second side 134, a first terminal end 136, a second terminal end 138, a third terminal end 176, a height 125, a front midpoint 127, a thickness 129, a length 131, a display surface 133, and defines a recess 140, an opening 142, a first cap 144, a first cavity 146, a first corner support 178, a second cavity 180, a second corner support 182, and a third cavity 184.

The recess 140 extends from the back 130 toward the front 128, from the first side 132 to the second side 134, from the first terminal end 136 to the second terminal end 138, from the first terminal end 136 to the third terminal end 176, and between the first and second corner supports 178, 182. The recess 140 of the first portion 120 is sized and configured to house a portion of the backboard 112. The opening 142 is defined on the front 128 between the front midpoint 127 and the bottom 126 and provides access to the recess 140. The first cap 144 extends from the front 128 to the back 130, from the top 124 toward the bottom 126, and from the first side 132 to the second side 134. The first cavity 146 extends from the recess 140 and into the first cap 144 and is sized and configured to receive a portion (e.g., top portion) of the backboard 112.

The first corner support 178 extends from the front 128 to the back 130, from the bottom 126 toward the top 124 to the second terminal end 138, and from the first side 132 toward the second side 134. The second cavity 180 extends from the recess 140 and into the first corner support 178 and is sized and configured to receive a portion (e.g., bottom corner) of the backboard 112. In the illustrated embodiment, the first corner support 178 extends along a portion of the length 131 of the first portion 120. The second corner support 182 extends from the front 128 to the back 130, from the bottom 126 toward the top 124 to the third terminal end 176, and from the second side 134 toward the first side 132. The third cavity 184 extends from the recess 140 and into the second corner support 182 and is sized and configured to receive a portion (e.g., bottom corner) of the backboard 112. In the illustrated embodiment, the second corner support 182 extends along a portion of the length 131 of the first portion 120.

The second portion 122 contacts the first portion 120 and extends away from the front 128 of the first portion 120. In the illustrated embodiment, the second portion 122 is disposed between the top 124 of the first portion 120 and the bottom 126 of the first portion 120 and extends from the front 128 of the first portion 120 and away from the back 130 of the first portion 120. The second portion 122 has a lengthwise axis 153, a top 154, a bottom 156, a first end 158, a second end 160, a first side 162, second side 164, a first height 155, a second height 157, a length 159, a first width 161, a second width 163, and defines a chamber 166.

The first width 161 of the second portion 122 is disposed at the first end 158 of the second portion 122, extends from the first side 162 to the second side 164, and is less than the length 131 of the first portion 120. The second width 163 of the second portion 122 is disposed at the second end 160 of the second portion 122, extends from the first side 162 to the second side 164, and is less than the first width 161 of the first portion 120. This structural arrangement results in the second portion 122 tapering from the first end 158 to the second end 160. However, alternative embodiments can include a second portion that tapers only along a portion of the length of the second portion or that has a constant width along its length.

In the illustrated embodiment, the plurality of securing members 118 includes a first securing member 170 and a second securing member 172. The first securing member 170 extends from the first cap 144 to the first corner support 178 and the second securing member 172 extends from the first cap 144 to the second corner support 182. Each securing member of the plurality of securing members 118 is a strap with a side release buckle. Optionally, a third securing member can be included in a cover, as shown in phantom lines in FIG. 21. When included, a third securing member can extend from a first cap to a bottom of a first portion. FIGS. 15 through 18 show the plurality of securing members 118 in hidden lines for clarity and to indicate that the plurality of securing members 118 can be omitted from, or replaced with other structure, to accomplish releasable attachment of the cover 110 to a basketball backboard 112 and rim 114.

A cover can have any dimensions suitable to accomplish covering a backboard and rim, as described herein and selection of suitable dimensions for a cover can be based on various considerations, such as the dimensions of a backboard to which a cover is to be releasably attached. Examples of dimensions considered suitable for a cover include those that are greater than, less than, equal to, about, within 10%, or within 20% the following dimensions: 62.5 inches for a length of a first portion, 38 inches for a height of a first portion, 31.5 inches from a top of a first portion to a second portion, 6.5 inches from a top of a second portion to a bottom of the second portion or a bottom of a first portion, 20 inches for a width of a second portion, 62.5 inches for a length of a cap (e.g., first cap, second cap), 8 inches for a height of a cap (e.g., from a top of a first portion to a first terminal end, from a bottom of a first portion to a second terminal end), 4 inches for a height of a corner support (e.g., from a bottom of a first portion to a terminal end (e.g., a second terminal end, a third terminal end), 6 inches for a length of a corner support (e.g., from a side of a first portion (e.g., a first side, a second side) toward a recess), 3 inches for a thickness of a first portion (e.g., a cap, a corner support), 4 inches for a thickness of a first portion (e.g., a cap, a corner support), 3 inches for a thickness of a cap of a first portion (e.g., a first cap, a second cap), 4 inches for a thickness of a cap of a first portion (e.g., a first cap, a second cap), 4 inches for a thickness of a corner support (e.g., a first corner support, a second corner support), 25 inches for a length of a second portion, and any other dimensions considered suitable for a particular embodiment.

Figure 25:
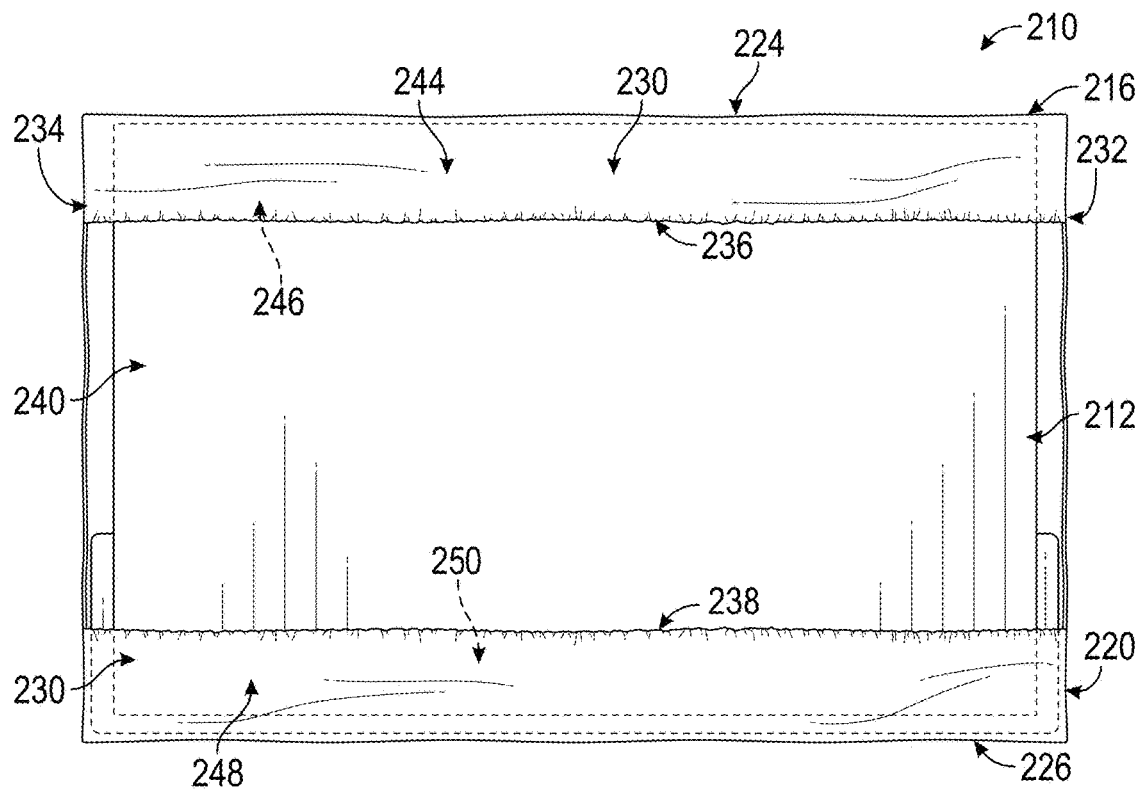
FIG. 25 is a rear view of another example basketball backboard and rim cover disposed over a basketball backboard and rim.
Figure 26:
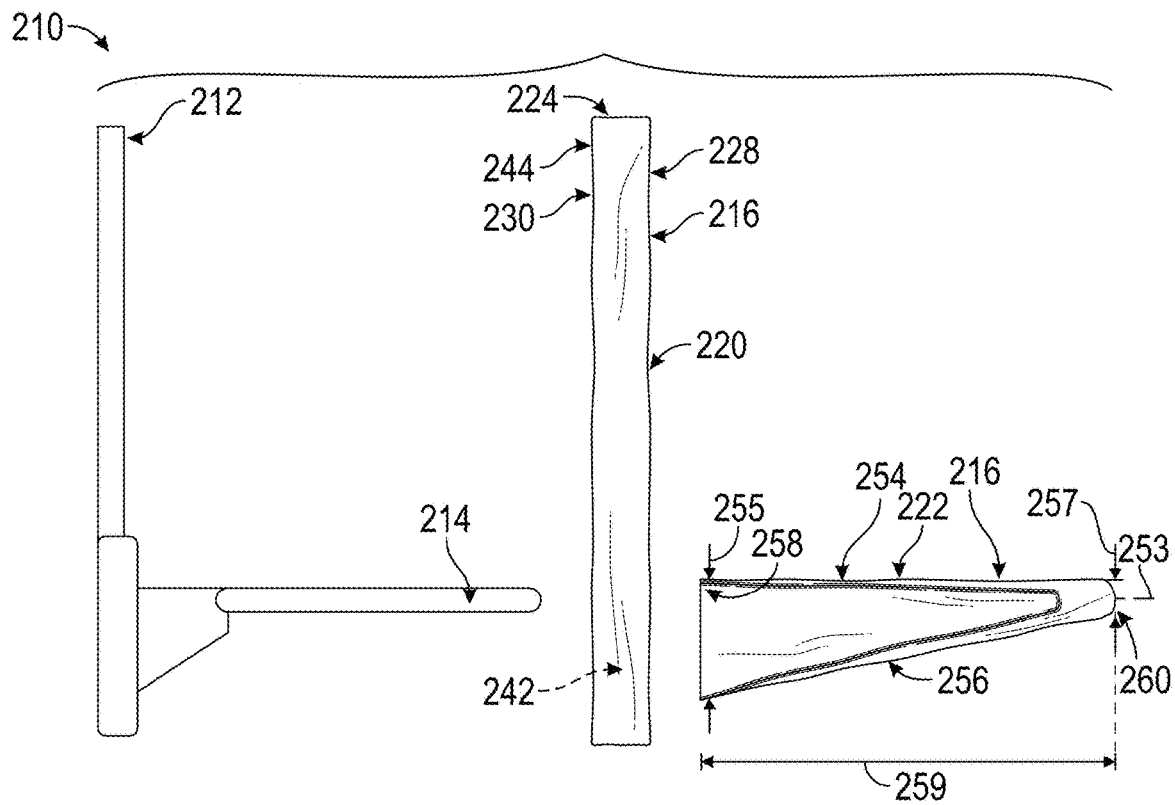
FIG. 26 is an exploded left side view of the cover, basketball backboard, and rim shown in FIG. 25. The exploded right side view of the cover, basketball backboard, and rim is a mirror image of the left side view.

FIGS. 25 and 26 illustrate another example basketball backboard and rim cover 210. FIGS. 25 and 26 illustrate the cover 210 disposed over a basketball backboard 212 and rim 214. The cover 210 is similar to the cover 10 illustrated in FIGS. 1 through 12 described above, except as detailed below. The cover 210 has a main body 216. The main body 216 has a first portion 220 and a second portion 222.

The first portion 220 has a top 224, a bottom 226, a front 228, a back 230, a first side 232, a second side 234, a first terminal end 236, a second terminal end 238, and defines a recess 240, an opening 242, a first cap 244, a first cavity 246, a second cap 248, and a second cavity 250.

The first cap 244 extends from the front 228 to the back 230, from the top 224 toward the bottom 226, and from the first side 232 to the second side 234. The first cavity 246 extends from the recess 240 and into the first cap 244 and is sized and configured to receive a portion (e.g., top portion) of the backboard 212. The first cap 244 includes the first terminal end 236. The second cap 248 extends from the front 228 to the back 230, from the bottom 226 toward the top 224, and from the first side 232 to the second side 234. The second cavity 250 extends from the recess 240 and into the second cap 248 and is sized and configured to receive a portion (e.g., bottom portion) of the backboard 212. The second cap 248 includes the second terminal end 238. In the illustrated embodiment, the first and second terminal ends 236, 238 are formed of an elastic material such that the cover 210 can stretch and shrink to conform to the structure of the backboard 212 during use. In addition, the first and second caps 244, 248 cover a portion of the backboard 212. However, alternative embodiments can include a first cap and a second cap that cooperatively cover an entire back of a backboard, a first cap that covers an entire back of a backboard, a second cap that covers an entire back of a backboard, or a first cap and a second cap that do not cover the entire back of a backboard.

The second portion 222 is attached to the front 228 of the first portion 220 and extends away from the first portion 220. In the illustrated embodiment, the second portion 222 is releasably attached to the first portion 220, is disposed between the top 224 of the first portion 220 and the bottom 226 of the first portion 220, completely surrounds the opening 242 defined by the first portion 220, extends from the front 228 of the first portion 220 and away from the back 230 of the first portion 220, and is formed of the a material that is different than the material that forms the first portion 220. However, in alternative embodiments, a second portion that is releasably attached to a first portion can be formed of a material that is the same as the material that forms a first portion. Any suitable type of releasable attachment can be accomplished between a second portion 222 and a first portion 220 and selection of a suitable type of releasable attachment can be based on various considerations, including the material(s) forming a first portion and/or a second portion. Examples of types of releasable attachment considered suitable between a second portion and a first portion include hook and loop fasteners, drawstrings that extend from a first portion to a second portion, buttons, snaps, clips, magnets, hook and eye fasteners, combinations of those described herein, and any other type of releasable attachment considered suitable for a particular embodiment.

The second portion 222 has a lengthwise axis 253, a top 254, a bottom 256, a first end 258, a second end 260, a first height 255, a second height 257, a length 259, and defines a chamber 266. The first height 255 of the second portion 222 is disposed at the first end 258 and, extends from the top 254 of the second portion 222 to the bottom 256 of the second portion 222, and is less than the height of the first portion 220. The second height 257 is disposed at the second end 260 of the second portion 222, extends from the top 254 of the second portion 222 to the bottom 256 of the second portion 222, and is less than the first height 255. However, alternative embodiments can include a second portion that has a second height that is equal to a first height of the second portion.

Various methods of covering a basketball backboard and methods of displaying indicia on a basketball backboard are described herein. While these methods are shown and described as a series of actions, it is to be understood and appreciated that the methods are not limited by the order of acts, as some acts may in accordance with these methods, occur in the order shown and/or described, in different orders, concurrently with other acts described herein, or be omitted.

Figure 27:
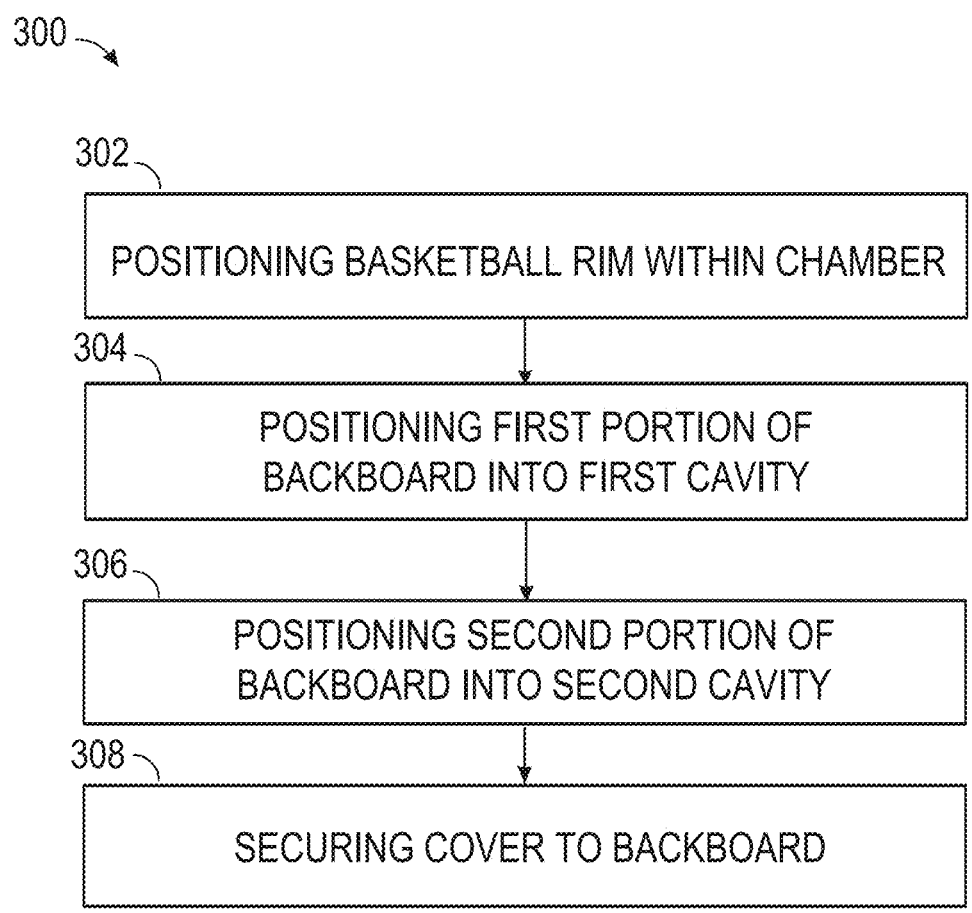
FIG. 27 is a schematic illustration of an example method of covering a basketball backboard and rim.

FIG. 27 is a schematic illustration of an example method of covering a basketball backboard and rim 300.

A step 302 comprises positioning a basketball rim within a chamber defined by a basketball backboard and rim cover. Another step 304 comprises positioning a first portion of a backboard into a first cavity defined by a first portion of the cover. Another step 306 comprises positioning a second portion of the backboard into a second cavity defined by the first portion of the cover. Another step 308 comprises securing the cover to the backboard.

Step 302 can be accomplished using any suitable basketball backboard and rim cover, such as those described herein. Examples of covers considered suitable to utilize to complete method 300 include cover 10, cover 110, cover 210, variations of the covers described herein, and any other cover considered suitable for a particular embodiment. Step 302 can be accomplished by positioning the basketball rim within a chamber defined by a second portion of a main body of a cover. Step 302 can be accomplished such that the entire rim, or combination of rim and net, are disposed (e.g., entirely) within a chamber defined by a basketball backboard and rim cover.

Step 304 can be accomplished by positioning a top portion of backboard (e.g., top) into a cavity (e.g., first cavity 46) defined by the first portion of the cover.

Step 306 can be accomplished by positioning a bottom portion of the backboard (e.g., bottom, bottom left corner) into a cavity (e.g., second cavity 50, second cavity 180) defined by the first portion of the cover. Optionally, step 306 can be repeated in embodiments in which a cover includes a first corner support and a second corner support such that a second bottom portion of the backboard (e.g., right bottom corner) is positioned within a cavity (e.g., third cavity 184) defined by the first portion of the cover.

Step 308 can be accomplished using any suitable method of securing a cover to a backboard. For example, step 308 can be accomplished by attaching first and second ends of a securing member, or of each securing member in a plurality of securing members, to one another (e.g., using a side release buckle).

Figure 28:
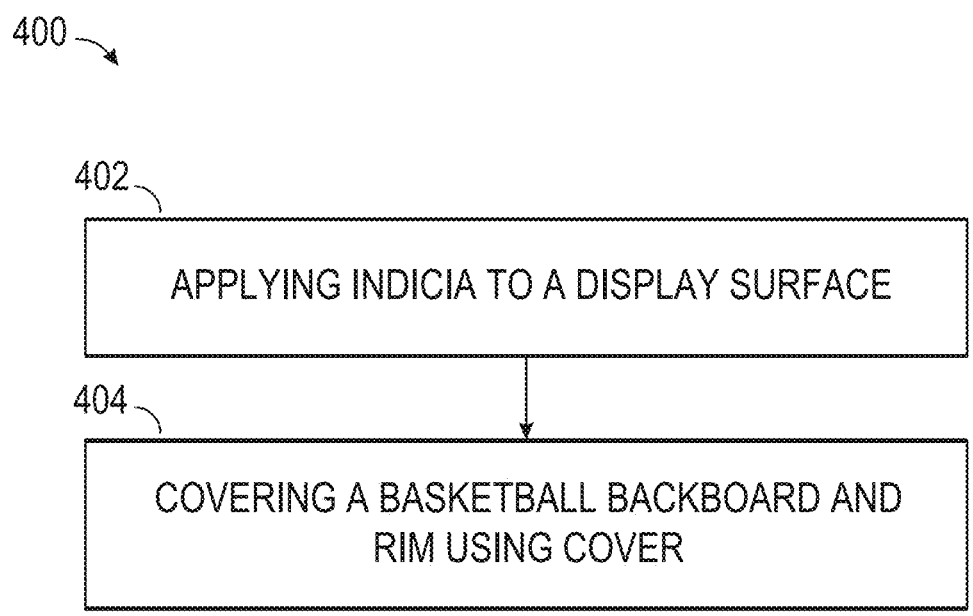
FIG. 28 is a schematic illustration of an example method of displaying indicia on a basketball backboard.
Figure 29:
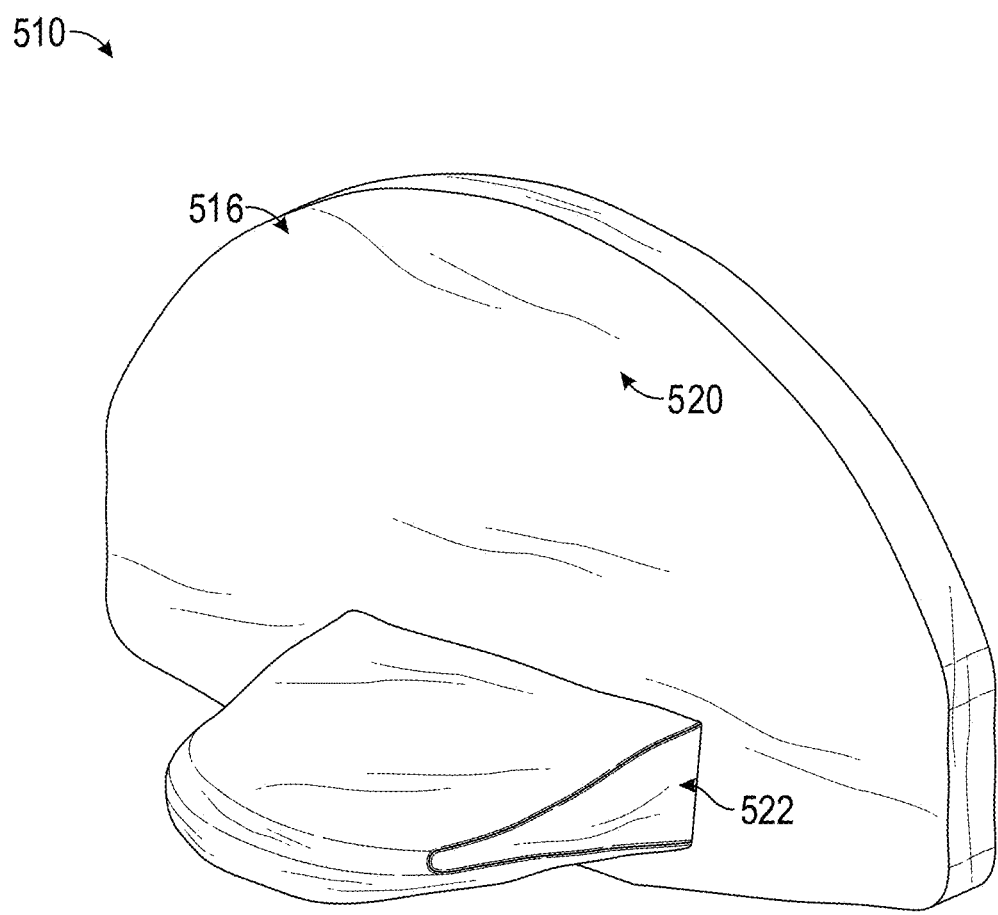
FIG. 29 is a perspective view of another example basketball backboard and rim cover.
Figure 30:
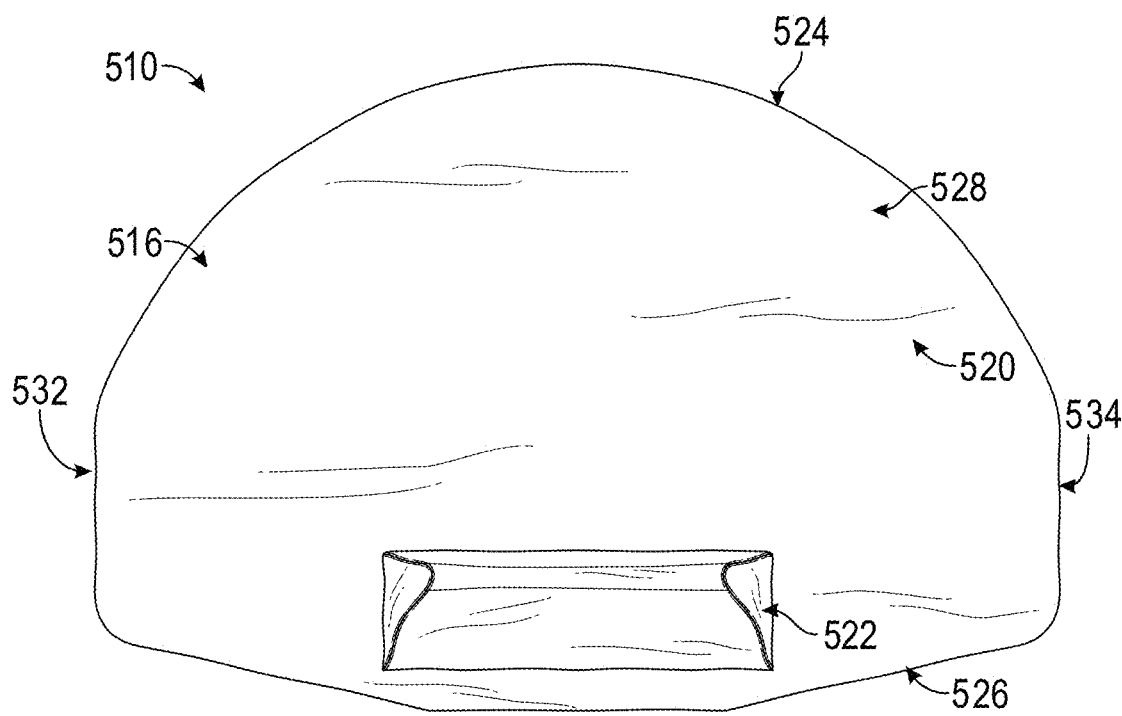
FIG. 30 is a front view of the cover shown in FIG. 29.
Figure 31:
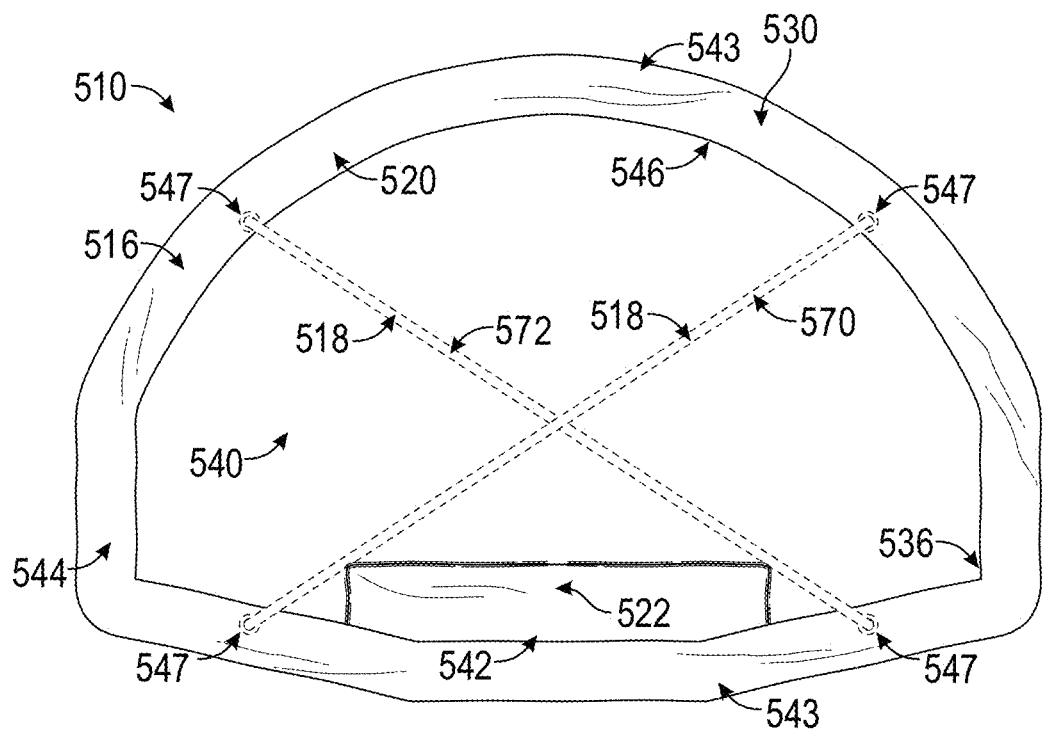
FIG. 31 is a rear view of the cover shown in FIG. 29.
Figure 32:
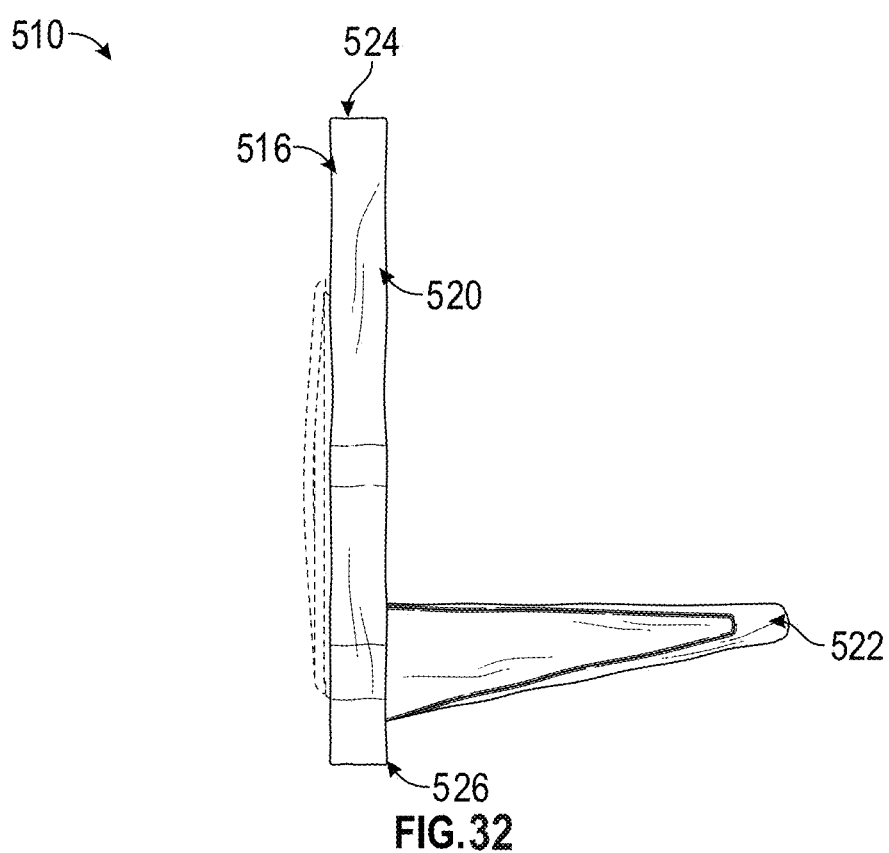
FIG. 32 is a left side view of the cover shown in FIG. 29. The right side view of the cover is a mirror image of the left side view.
Figure 33:
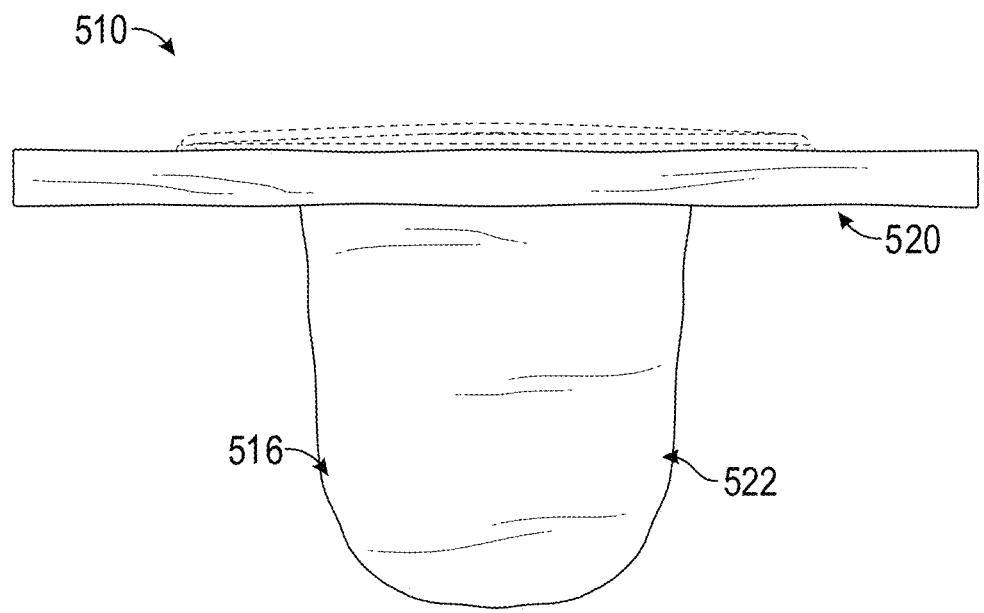
FIG. 33 is a top view of the cover shown in FIG. 29.
Figure 34:
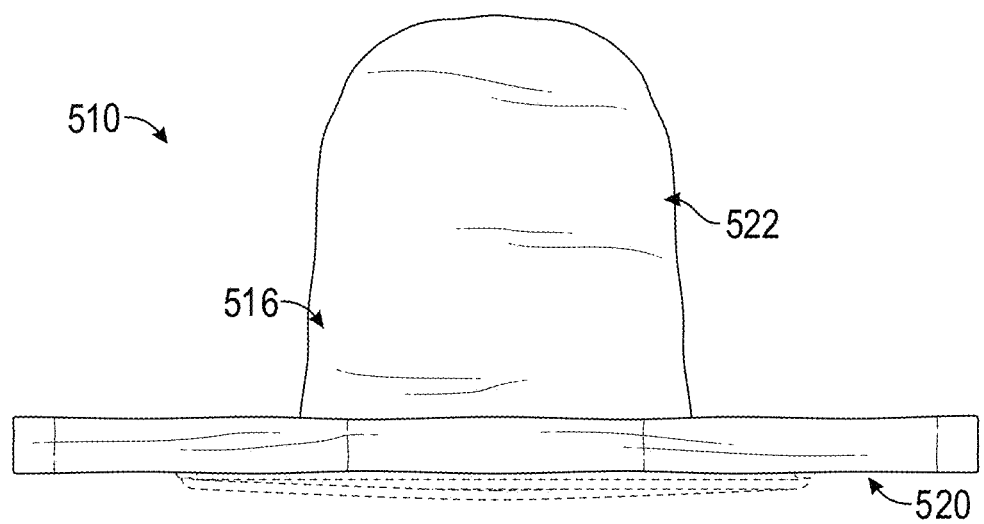
FIG. 34 is a bottom view of the cover shown in FIG. 29.

FIG. 28 is a schematic illustration of an example method of displaying indicia on a basketball backboard 400.

A step 402 comprises applying indicia to a display surface of a basketball backboard and rim cover. Another step 404 comprises covering a basketball backboard and rim using the cover.

Step 402 can be accomplished using any suitable basketball backboard and rim cover, such as those described herein. Examples of covers considered suitable to utilize to complete method 400 include cover 10, cover 110, cover 210, variations of the covers described herein, and any other cover considered suitable for a particular embodiment. Step 402 can be accomplished by applying any suitable indicia to a display surface using any suitable material, technique, or method of application. Examples of techniques and methods of applying an indicia to a cover include using an adhesive, stitching, printing, and any other technique or method considered suitable for a particular embodiment.

Step 404 can be accomplished by completing method 300.

FIGS. 29 through 34 illustrate another example basketball backboard and rim cover 510. The cover 510 is similar to the cover 10 illustrated in FIGS. 1 through 12 described above, except as detailed below. The cover 510 has a main body 516 and a plurality of securing members 518. The main body 516 has a first portion 520 and a second portion 522.

The first portion 520 has a top 524, a bottom 526, a front 528, a back 530, a first side 532, a second side 534, a first terminal end 536, and defines a recess 540, an opening 542, a first cap 544, and a first cavity 546.

The first cap 544 extends from the front 528 to the back 530, from the top 524 toward the bottom 526, from the first side 532 toward the second side 534, from the second side 534 toward the first side 532, and from the bottom 526 toward the top 524. In the illustrated embodiment, the first cap 544 extends around the entire perimeter of the cover 510. The first cavity 546 extends from the recess 540 and into the first cap 544 and is sized and configured to receive a portion of a backboard (e.g., perimeter of a backboard). The first cap 544 includes the first terminal end 536.

In the illustrated embodiment, the plurality of securing members 518 includes a first securing member 570 and a second securing member 572. The first securing member 570 extends from a top portion 543 of the first cap 544 to a bottom portion 545 of the first cap 544 and the second securing member 572 extends from the top portion 543 of the first cap 544 to the bottom portion 545 of the first cap 544. Each securing member of the plurality of securing members 518 is a drawstring that extends through an eyelet 547 disposed on the cover 510. However, alternative embodiments can include a securing member that is a bunger cord.

Figure 35:
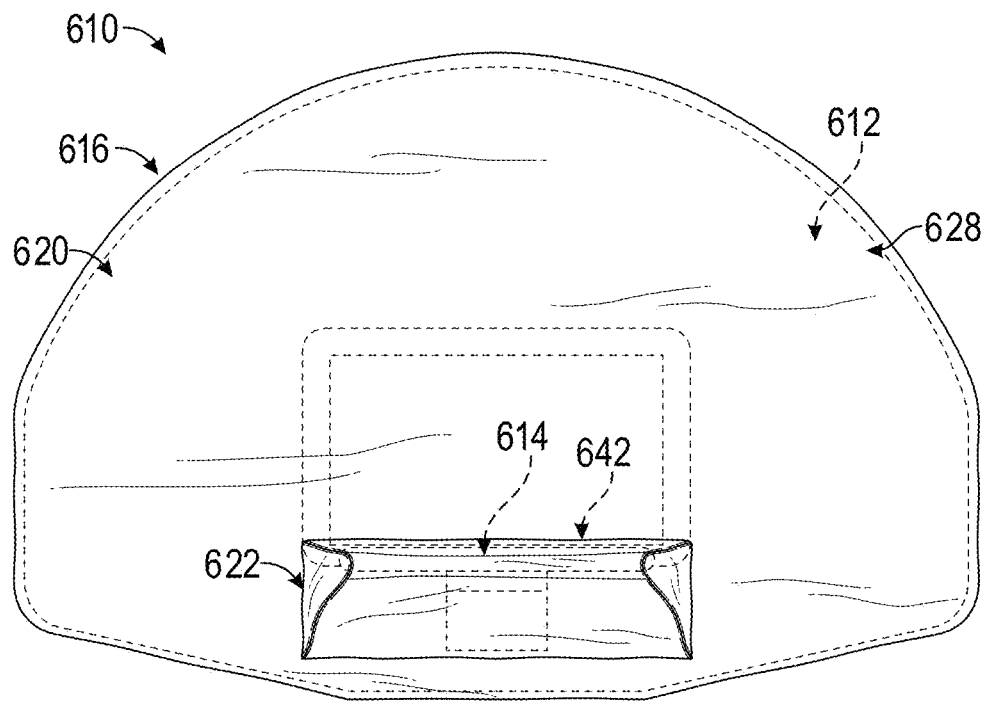
FIG. 35 is a front view of another basketball backboard and rim cover disposed over a basketball backboard and rim. The cover is in a second, closed configuration.
Figure 36:
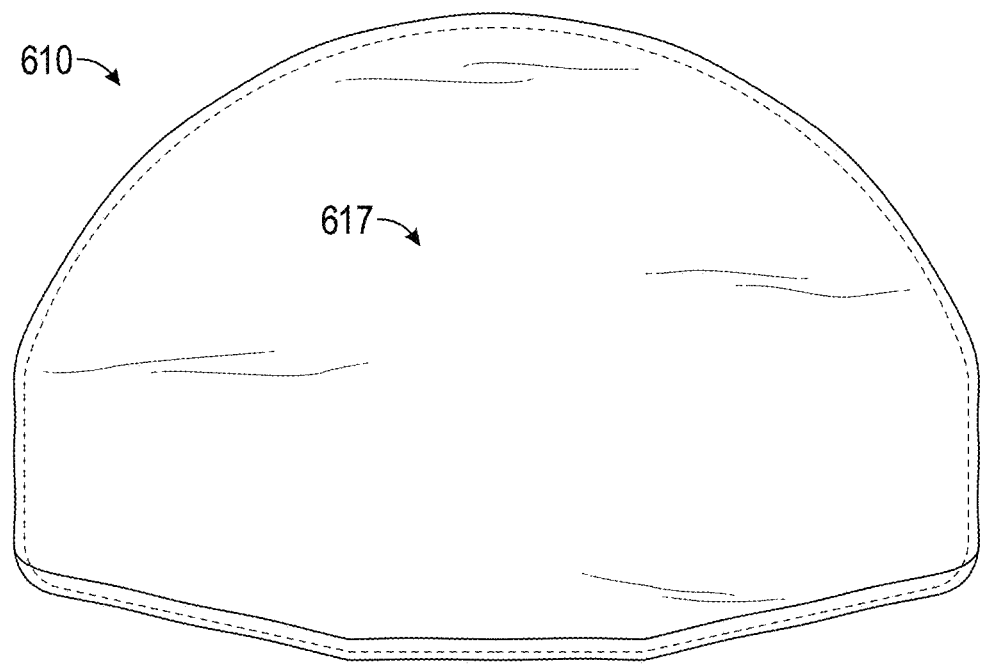
FIG. 36 is a rear view of the cover, basketball backboard, and rim shown in FIG. 35. The cover is in a second, closed configuration.
Figure 37:
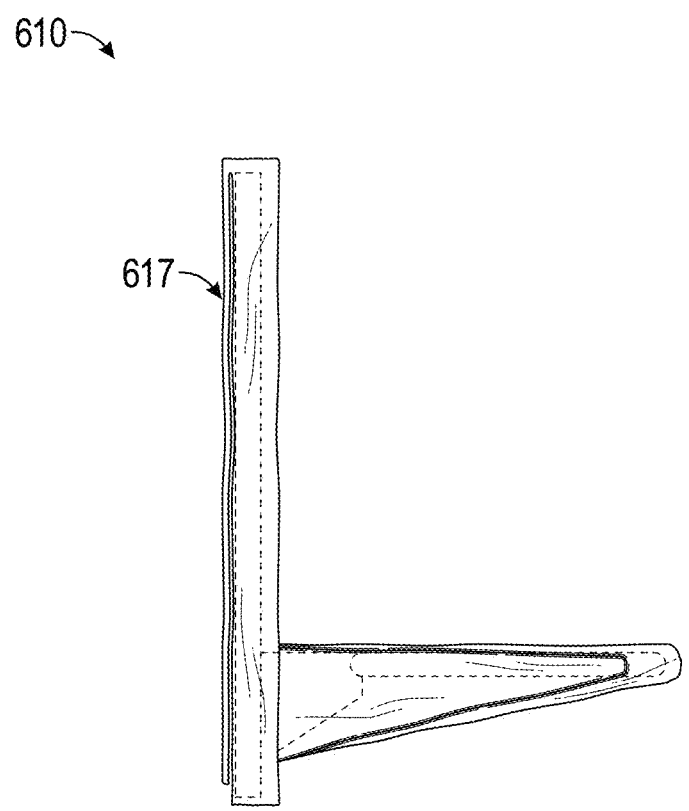
FIG. 37 is a left side view of the cover, basketball backboard, and rim shown in FIG. 35. The right side view of the cover, basketball backboard, and rim is a mirror image of the left side view. The cover is in a second, closed configuration.
Figure 38:
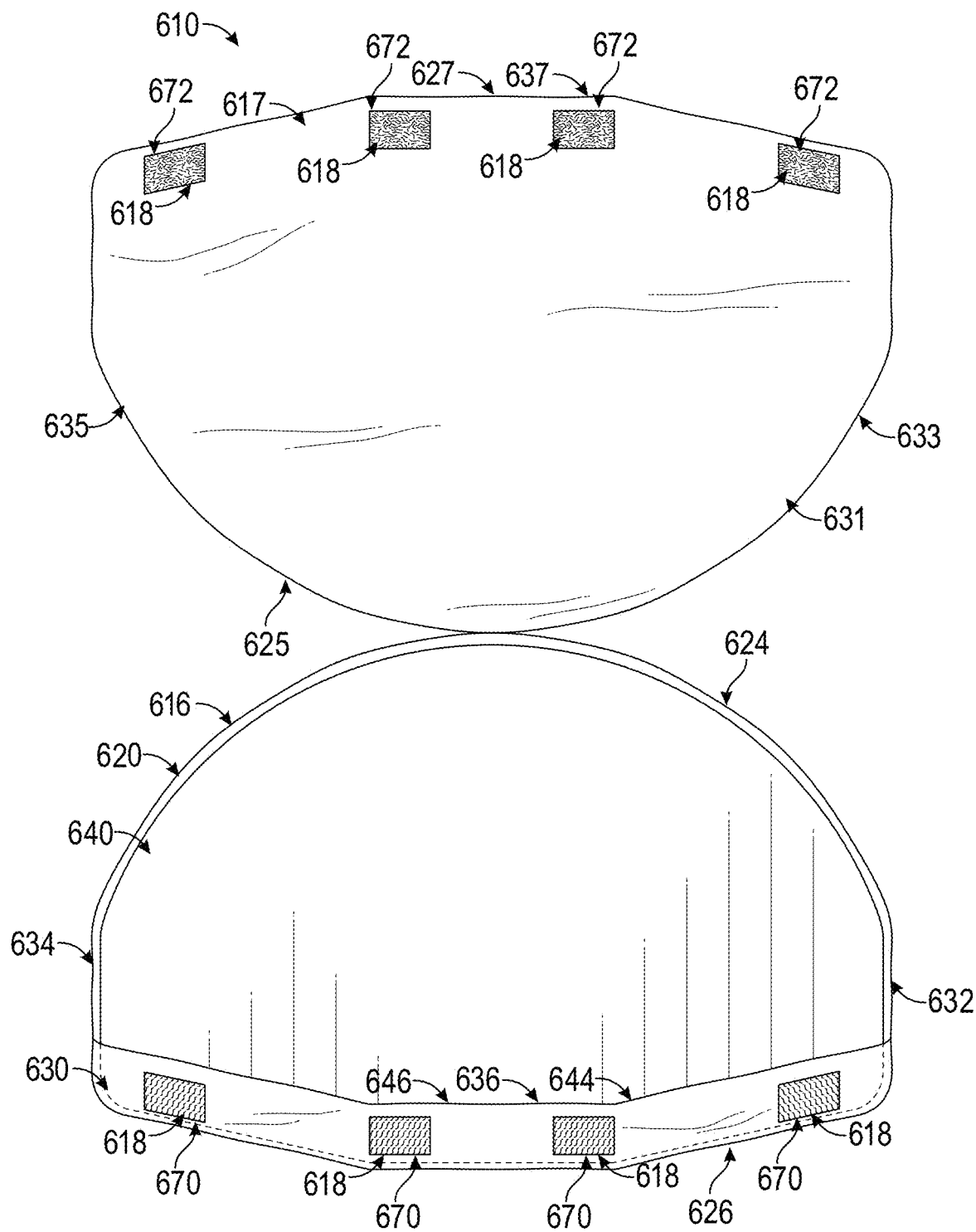
FIG. 38 is a rear view of the cover, basketball backboard, and rim shown in FIG. 35. The cover is in a first, open configuration.
Figure 39:
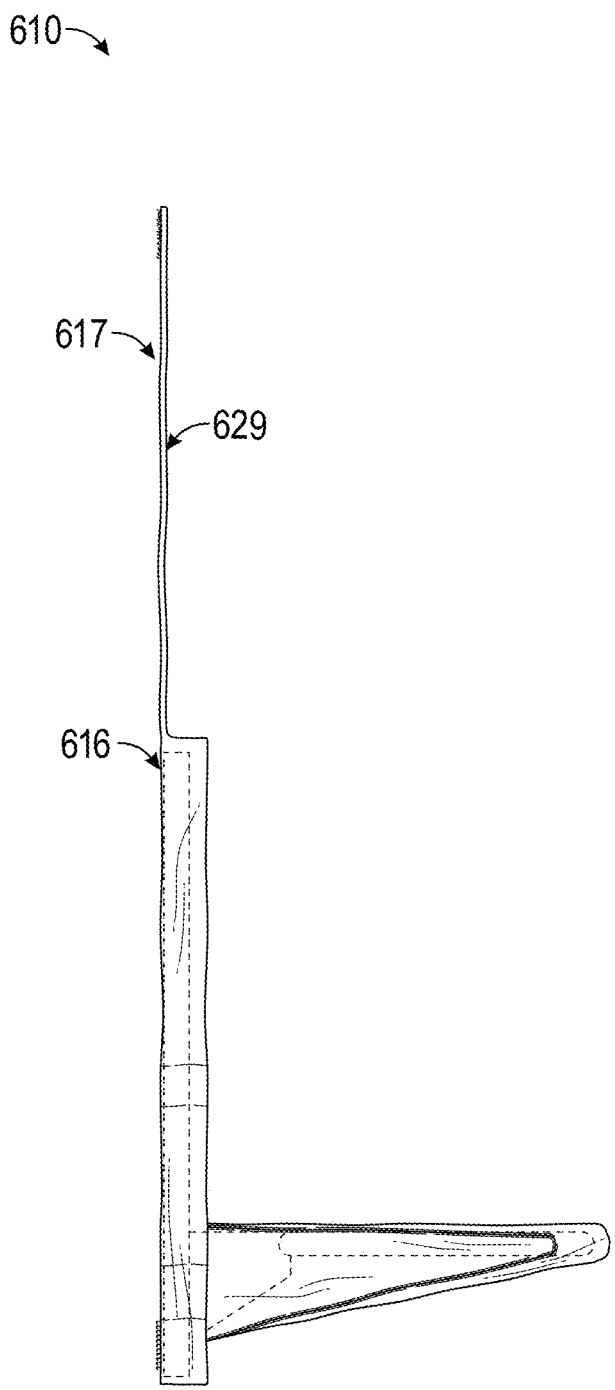
FIG. 39 is a left side view of the cover, basketball backboard, and rim shown in FIG. 35. The right side view of the cover, basketball backboard, and rim is a mirror image of the left side view. The cover is in a first, open configuration.

FIGS. 35 through 39 illustrate another example basketball backboard and rim cover 610. FIGS. 35 through 39 illustrate the cover 610 disposed over a basketball backboard 612 and rim 614. The cover 610 is similar to the cover 10 illustrated in FIGS. 1 through 12 described above, except as detailed below. The cover 610 has a main body 616, a tail 617, and a plurality of securing members 618. The main body 616 has a first portion 620 and a second portion 622. The cover 610 is moveable between a first, open configuration, as shown in FIGS. 38 and 39, and a second, closed configuration, as shown in FIGS. 35 through 37.

The first portion 620 has a top 624, a bottom 626, a front 628, a back 630, a first side 632, a second side 634, a first terminal end 636, and defines a recess 640, an opening 642, a first cap 644, and a first cavity 646.

The first cap 644 extends from the front 628 to the back 630, from the bottom 626 toward the top 624, and from the first side 632 toward the second side 634. The first cavity 646 extends from the recess 640 and into the first cap 644 and is sized and configured to receive a portion (e.g., bottom portion) of the backboard 612. The first cap 644 includes the first terminal end 636.

The tail 617 of the cover 610 is hingedly attached to the top 624 of the first portion 620. However, in alternative embodiments a tail of a cover can be attached to any suitable portion of a first portion of a cover. The tail 617 has a top 625, a bottom 627, a front 629, a back 631, a first side 633, a second side 635, and a first terminal end 637.

In the illustrated embodiment, the plurality of securing members 618 includes a first set of securing members 670 and a second set of securing member 672. The first set of securing members 670 is disposed on the back 630 of the first portion 620 and the second set of securing members 672 is disposed on the back 631 of the tail 617. Each securing member of the first set of securing members 670 is located such that it mates with a securing member in the second set of securing member 672. Each securing member of the plurality of securing members 618 is a hook and loop fastener (e.g., Velcro).

The basketball backboard and rim covers, methods of covering a basketball backboard, and methods of displaying indicia on a basketball backboard described herein are considered advantageous at least because they allow for easy installation of protective equipment for basketball goals. In addition, they allow for the placement of indicia in a manner in which exposure to large groups of people can be achieved. For example, the covers described herein provide protection for a backboard, rim, net, and/or mounting brackets from the elements, prevent wear, and avoid deterioration caused by inclement weather. In addition, the covers provide a mechanism for easy installation and removal such that indicia (e.g., advertising material) can be displayed prior to and/or subsequent to sporting events.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular arrangement of elements and steps disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A basketball backboard and rim cover comprising: a main body having a first portion and a second portion; the first portion having a front, a back, and defining a recess, an opening, and a first cap, the recess extending from the back toward the front, the opening defined on the front and providing access to the recess, the first cap having a top portion and a bottom portion; the second portion attached to the first portion and extending away from the front of the first portion, the second portion having a first end, a second end, and defining a chamber extending from the opening defined by the first portion toward the second end of the second portion; a first securing member extending from the top portion of the first cap to the bottom portion of the first cap; and a second securing member extending from the top portion of the first cap to the bottom portion of the first cap.

2. The cover of claim 1, wherein the first portion has a top, a bottom, a first side, and a second side; and
wherein the first cap extends from the front to the back, from the top toward the bottom, from the first side toward the second side, from the second side toward the first side, and from the bottom toward the top.

3. The cover of claim 1, wherein the first portion defines a first cavity extending from the recess and into the first cap.

4. The cover of claim 1, wherein each of the first securing member and the second securing member is a strap with a side release buckle.

5. The cover of claim 1, wherein the first portion has a first side, a second side, and a length extending from the first side of the first portion to the second side of the first portion; and
wherein the second portion has a first side, a second side, and a width extending from the first side of the second portion to the second side of the second portion, the width of the second portion being less than the length of the first portion.

6. The cover of claim 1, wherein the first portion has a thickness extending from the front to the back; and
wherein the second portion has a length extending from the first end to the second end, the length of the second portion being greater than the thickness of the first portion.

7. The cover of claim 1, wherein the first portion has a top, a bottom, and a height extending from the top of the first portion to the bottom of the first portion; and
wherein the second portion has a top, a bottom, and a height at the first end extending from the top of the second portion to the bottom of the second portion, the height of the second portion being less than the height of the first portion.

8. The cover of claim 1, wherein the second portion completely surrounds the opening defined by the first portion.

9. The cover of claim 1, wherein the second portion is disposed at an angle relative to the front of the first portion that is greater than 45 degrees.

10. The cover of claim 1, wherein the second portion is disposed at an angle relative to the front of the first portion that is substantially equal to 90 degrees.

11. The cover of claim 1, wherein the second portion has a top and a bottom; and
wherein the bottom of the second portion extends from the second end of the second portion toward the first portion and parallel to the top of the second portion.

12. The cover of claim 1, wherein the first portion has a top and a bottom;
wherein the front has a front midpoint disposed between the top and the bottom; and
wherein the second portion is disposed between the front midpoint and the bottom of the first portion.

13. The cover of claim 1, wherein the first portion and the second portion are formed of the same material.

14. The cover of claim 1, wherein the main body is formed of a water resistant material.

15. The cover of claim 1, wherein the main body is formed of vinyl.

16. The cover of claim 1, wherein the second portion is permanently attached to the first portion.

17. The cover of claim 1, wherein the entire first end of the second portion contacts the first portion.

18. The cover of claim 1, wherein the recess of the first portion is sized and configured to house a portion of said basketball backboard; and
wherein the chamber of the second portion is sized and configured to house said rim.

19. A basketball backboard and rim cover comprising: a main body having a first portion and a second portion; the first portion having a front, a back, a top, a bottom, a perimeter, and defining a recess, an opening, and a first cap, the front having a front midpoint disposed between the top and the bottom, the recess extending from the back toward the front, the opening defined on the front and providing access to the recess, the first cap extending around the entire perimeter and having a top portion and a bottom portion; the second portion attached to the first portion, completely surrounding the opening defined by the first portion, disposed between the front midpoint and the bottom of the first portion, and extending away from the front of the first portion, the second portion having a first end, a second end, and defining a chamber extending from the opening defined by the first portion toward the second end of the second portion; a first securing member extending from the top portion of the first cap to the bottom portion of the first cap; and a second securing member extending from the top portion of the first cap to the bottom portion of the first cap; wherein the first portion and the second portion are formed of the same material.

20. A basketball backboard and rim cover comprising: a main body having a first portion and a second portion; the first portion having a front, a back, a top, a bottom, a first side, a second side, a length, a height, a perimeter, and defining a recess, an opening, and a first cap, the front having a front midpoint disposed between the top and the bottom, the length extending from the first side of the first portion to the second side of the first portion, the height extending from the top of the first portion to the bottom of the first portion, the recess extending from the back toward the front, the opening defined on the front and providing access to the recess, the first cap extending around 7 of 10 the entire perimeter and having a top portion and a bottom portion; the second portion attached to the first portion, completely surrounding the opening defined by the first portion, disposed between the front midpoint and the bottom of the first portion, and extending away from the front of the first portion, the second portion having a first end, a second end, a top, a bottom, a first side, a second side, a height at the first end, a width, and defining a chamber extending from the opening defined by the first portion toward the second end of the second portion, the entire first end of the second portion contacting the first portion, the height of the second portion extending from the top of the second portion to the bottom of the second portion, the height of the second portion being less than the height of the first portion, the width extending from the first side of the second portion to the second side of the second portion, the width of the second portion being less than the length of the first portion; a first securing member extending from the top portion of the first cap to the bottom portion of the first cap; and a second securing member extending from the top portion of the first cap to the bottom portion of the first cap; wherein the first portion and the second portion are formed of vinyl.

* * * * *